United States Patent
Hasegawa

(10) Patent No.: US 8,493,401 B2
(45) Date of Patent: Jul. 23, 2013

(54) IMAGE PROCESSING APPARATUS, IMAGE DISPLAYING APPARATUS, AND IMAGE PROCESSING METHOD

(75) Inventor: Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 453 days.

(21) Appl. No.: 12/568,182

(22) Filed: Sep. 28, 2009

(65) Prior Publication Data

US 2010/0079477 A1 Apr. 1, 2010

(30) Foreign Application Priority Data

Sep. 30, 2008 (JP) ................................. 2008-252668

(51) Int. Cl.
*G09G 5/02* (2006.01)
*G03B 21/26* (2006.01)
*G03B 21/00* (2006.01)

(52) U.S. Cl.
USPC .................. 345/589; 353/30; 353/31; 353/94

(58) Field of Classification Search
None
See application file for complete search history.

(56) References Cited

U.S. PATENT DOCUMENTS

| 7,173,596 B2 * | 2/2007 | Toriumi et al. ................. 345/98 |
| 7,267,442 B2 * | 9/2007 | Childers et al. ................ 353/31 |
| 2004/0028293 A1 * | 2/2004 | Allen et al. ................... 382/300 |
| 2006/0017998 A1 * | 1/2006 | Fujino ............................ 359/204 |
| 2006/0221304 A1 * | 10/2006 | Damera-Venkata et al. ... 353/30 |
| 2009/0122070 A1 | 5/2009 | Aragaki et al. |

FOREIGN PATENT DOCUMENTS

| JP | A-8-102901 | 4/1996 |
| JP | A-10-215461 | 8/1998 |
| JP | A-2003-015581 | 1/2003 |
| JP | 2006174184 A * | 6/2006 |
| JP | A-2009-122156 | 6/2009 |

OTHER PUBLICATIONS

Gregg Hawkes; "Video Scene Coherence, Frame Buffers, and Line Buffers"; (2002), Application Note: MicroBlaze and Multimdia Development Board (XILINX).*
Sing Bing Kang; Weiss, R.; , "Characterization of errors in compositing panoramic images," Computer Vision and Pattern Recognition, 1997. Proceedings., 1997 IEEE Computer Society Conference on , vol., no., pp. 103-109, Jun. 17-19, 1997.*

* cited by examiner

*Primary Examiner* — Kee M Tung
*Assistant Examiner* — Zhengxi Liu
(74) *Attorney, Agent, or Firm* — Oliff & Berridge, PLC

(57) ABSTRACT

An image processing apparatus for correcting image signals corresponding to a plurality of color images constituting an image, includes: a correction table storage unit storing one or more correction tables; and an image signal correcting unit independently correcting the image signals of the color images on the basis of one or more correction tables stored in the correction table storage unit, wherein the image signal correcting unit makes a geometric correction of a display image corresponding to the image such that display color images each corresponding to the color images superpose each other, independently among the color image.

21 Claims, 15 Drawing Sheets

IMAGE PROCESSING APPARATUS, IMAGE DISPLAYING APPARATUS, AND IMAGE PROCESSING METHOD

BACKGROUND

1. Technical Field

The present invention relates to an image processing apparatus, an image displaying apparatus, and an image processing method.

2. Related Art

A projector as an image displaying apparatus (image projecting apparatus) can be installed easily and can display a large-sized image at low cost, which could not be obtained by liquid crystal displays. The projector projects an image onto a screen. Accordingly, when the positional relation between the projector body and the screen is changed, a characteristic of the projector is that the shape of a display image is changed. For this reason, recent projectors correct the shape of a display image, which is changed depending on the positional relation between the projector body and the screen, by making a geometric correction such as a keystone correction as an imaging process.

The projector displays a large-sized image by making light from a light source (lamp) incident on a light modulating device, synthesizing or extending and projecting an image by the use of an optical system, and focusing the image on the screen. The color of a display pixel on the screen corresponding to one pixel is expressed by superposing display sub pixels corresponding to plural sub pixels of primary color components. Accordingly, a phenomenon (pixel shift) that the display positions of the display sub pixels of the color components are shifted from each other occurs due to an installation precision of the light modulating device, an influence of temperature on expansion and contraction, chromatic aberration of components of the optical system, or the like, thereby deteriorating the image quality.

Therefore, for example, JP-A-8-102901 discloses a technique of making the keystone correction and making a correction of the pixel shift. In JP-A-8-102901, the position of the image on a liquid crystal panel, as the light modulating device, is shifted in parallel in the unit of pixels by shifting the time points of horizontal and vertical synchronization signals. By sequentially making the keystone correction and adjusting the time points of the horizontal and vertical synchronization signals, the keystone correction and the correction of the pixel shift are made.

However, in the technique disclosed in JP-A-8-102901, the parallel shift of the image position on the liquid crystal panel is carried out only in the unit of pixels and thus the deterioration in image quality due to the pixel shift may not be satisfactorily suppressed. In the technique disclosed in JP-A-8-102901, a circuit for making the keystone correction and a circuit for adjusting the time points of the horizontal and vertical synchronization signals are required, thereby enhancing the circuit size and elongating the delay time of the imaging process.

SUMMARY

An advantage of some aspects of the invention is that it provides an image processing apparatus, an image displaying apparatus, and an image processing method which, with a simple structure, can make a correction of a pixel shift and a geometric correction.

According to an aspect of the invention, there is provided an image processing apparatus for correcting image signals corresponding to a plurality of color images constituting an image, including: a correction table storage unit storing one or more correction tables; and an image signal correcting unit independently correcting the image signals of color images on the basis of one or more correction tables stored in the correction table storage unit. Here, the image signal correcting unit makes a geometric correction of a display image corresponding to the image such that display color images each corresponding to the color images superpose each other, independently among the color image.

According to this configuration, since the image signals are corrected independently among the color components on the basis of a correction table stored in the correction table storage unit and the geometric correction of the display image formed by the display pixels displayed by superposing the display sub pixels is made, it is possible to provide an image processing apparatus capable of making a geometric correction with a simple structure without adjusting the time points of the horizontal and vertical synchronization signals.

In the image processing apparatus, the correction table storage unit may store a correction table including correction data corresponding to an amount of pixel shift in the display position of the display color image and a geometric correction amount of the display image, and the image signal correcting unit may correct the image signals so as to make a geometric correction of the display image and corrects the pixel shift to correspond to the amount of pixel shift.

According to this configuration, since the correction tables, including the correction data corresponding to the amount of pixel shift, and the geometric correction amount are stored in the correction table storage unit, it is possible to make both correction of the pixel shift and a geometric correction with a simple structure. Accordingly, it is also possible to reduce the delay time of the image process.

In the image processing apparatus, the image signal correcting unit may correct the image signal of sub pixel constituting the color image to make a geometric correction of the display image and correct the pixel shift by interpolating the image signal of the one sub pixel and the image signals corresponding to one or more sub pixels around the one sub pixel on the basis of the correction table.

According to this configuration, since the image signal of one sub pixel and the image signals corresponding to one or more sub pixels around the one sub pixel are interpolated on the basis of the correction tables, it is possible to provide an image processing apparatus capable of making a correction of the pixel shift in a unit smaller than one pixel and making both a correction of the pixel shift and a geometric correction with a simple structure.

In the image processing apparatus, when one pixel is constructed by N (where N is an integer of 2 or greater) sub pixels, the correction table storage unit may store N types of correction tables of which each correction table includes correction data corresponding to the amount of pixel shift in the display position of the display sub pixels and the geometric correction amount of the display image. In this case, the image signal correcting unit may independently correct the image signals among the color image on the basis of the correction tables which differ depending on the color image.

According to this configuration, it is possible to provide an image processing apparatus with a simple structure which is capable of independently making a correction among the N types of color components. Therefore, it is possible to simultaneously perform plural types of correction processes such as the correction of the pixel shift and the geometric correction on the respective color components.

In the image processing apparatus, when one pixel is constructed by N (where N is an integer of 2 or greater) sub pixels, the correction table storage unit may store (N−1) types of correction tables of which each correction table includes correction data corresponding to the amount of pixel shift in the display position of the display sub pixels. In this case, the image signal correcting unit may correct the image signals of the (N−1) types of color images independently.

According to this configuration, it is possible to provide an image processing apparatus with a simple structure which is independently capable of making a correction among (N−1) types of color components. Therefore, with respect to the display position of the display sub pixel of one color component, it is possible to correct the pixel shift corresponding to the amount of pixel shift in the display position of the display sub pixels of the other color components.

In the image processing apparatus, when an image is displayed on a cylindrical screen with a radius R by an image displaying apparatus disposed backwardly apart by L from a point of view located at the center of the cylindrical screen, a correction table stored in the correction table storage unit may include correction data of an angle θ by the use of the following expression, $$\Delta x = \frac{R(L + \sqrt{R^2 - w^2})\sin\theta}{R\cos\theta + L} - \sqrt{R^2 - w^2}\tan\theta$$

where 2w represents the width in the horizontal direction of the cylindrical screen as viewed from the point of view and Δx represents correction data for the sub pixel in the direction of the angle θ from the point of view.

According to this configuration, it is possible to provide an image processing apparatus capable of making a geometric correction of an image projected onto the cylindrical screen at the same time as correcting the pixel shift with a simple structure.

According to another aspect of the invention, there is provided an image displaying apparatus for displaying an image on the basis of image signals corresponding to a plurality of color images constituting the image, including: the above-mentioned image processing apparatus; and an image displaying unit making a display to superpose display color images corresponding to the color image on the basis of the image signals corrected by the image processing apparatus.

According to this configuration, it is possible to provide an image displaying apparatus capable of displaying an image suppressed deterioration in image quality or having been subjected to the geometric correction by making a correction of the pixel shift or a geometric correction with a simple structure.

According to another aspect of the invention, there is provided an image processing method of correcting image signals corresponding to a plurality of color images constituting an image, including: acquiring the image signals corresponding to the color images; and independently correcting the acquired image signals among the color images on the basis of one or more correction tables stored in a correction table storage unit. Here, the correction of the image signals includes making a geometric correction of a display image corresponding to the image such that display color images each corresponding to the color images superpose each other, independently among the color image.

According to this configuration, since the image signals are independently corrected among the color components on the basis of one or more correction tables stored in the correction stable storage unit and the geometric correction of the display image formed by the display pixels displayed by superposing the display sub pixels is made for each color component, it is possible to provide an image processing method capable of making a geometric correction with a simple structure without adjusting the time points of the horizontal and vertical synchronization signals.

In the image processing method, the correction table storage unit may store a correction table including correction data corresponding to an amount of pixel shift in the display position of the display color images and a geometric correction amount of the display image. Here, the correction of the image signals may include correcting the image signals so as to make a geometric correction of the display image and correcting the pixel shift to correspond to the amount of pixel shift.

According to this configuration, since the image signals are independently corrected among the color components on the basis of the correction tables including the correction data corresponding to the amount of pixel shift and the geometric correction amount, it is possible to make both a correction of the pixel shift and a geometric correction with a simple structure. Accordingly, it is also possible to reduce the delay time of the image process.

In the image processing method, the correction of the image signals may include making a geometric correction of the image signal of sub pixel constituting the color image and correcting the pixel shift by interpolating the image signal of the one sub pixel and the image signals corresponding to one or more sub pixels around the one sub pixel on the basis of the correction table.

According to this configuration, since the image signal of one sub pixel and the image signals corresponding to one or more sub pixels around the one sub pixel are interpolated on the basis of the correction tables, it is possible to provide an image processing method capable of making a correction of the pixel shift in a unit smaller than one pixel and making, with a simple structure, both a correction of the pixel shift and a geometric correction.

In the image processing method, when one pixel is constructed by N (where N is an integer of 2 or greater) sub pixels, the correction table storage unit may store N types of correction tables of which each correction table includes correction data corresponding to the amount of pixel shift in the display position of the display sub pixels and the geometric correction amount of the display image, and the correction of the image signals may include independently correcting the image signals among the color image on the basis of the correction tables which differ depending on the color image.

According to this configuration, it is possible to provide an image processing method capable of making an independent correction among the N types of color components with a simple structure. Therefore, it is possible to simultaneously perform plural types of correction processes such as the correction of the pixel shift and the geometric correction on the respective color components.

In the image processing method, when one pixel is constructed by N (where N is an integer of 2 or greater) sub pixels, the correction table storage unit may store (N−1) types of correction tables of which each correction table includes correction data corresponding to the amount of pixel shift in the display position of the display sub pixels, and the correction of the image signals may include independently correcting the image signals of the (N−1) types of color components among the color image.

According to this configuration, it is possible to provide an image processing method capable of making an independent correction among (N−1) types of color components with a simple structure. Therefore, with respect to the display position of the display sub pixel of one color component, it is possible to correct the pixel shift corresponding to the amount of pixel shift in the display position of the display sub pixels of the other color components.

In the image processing method, when an image is displayed on a cylindrical screen with a radius R by an image displaying apparatus disposed backwardly apart by L from a point of view located at the center of the cylindrical screen, a correction table stored in the correction table storage unit may include correction data of an angle θ by the use of the following expression, $$\Delta x = \frac{R(L + \sqrt{R^2 - w^2})\sin\theta}{R\cos\theta + L} - \sqrt{R^2 - w^2}\tan\theta$$

where 2w represents the width in the horizontal direction of the cylindrical screen as viewed from the point of view and Δx represents correction data for the sub pixel in the direction of the angle θ from the point of view.

According to this configuration, it is possible to provide an image processing method capable of making a geometric correction of an image projected onto the cylindrical screen at the same time as correcting the pixel shift with a simple structure.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in detail with reference to the accompanying drawings. The following embodiments are not intended to unfairly restrict the details of the invention described in the claims. All elements described below are not essential requirements of the invention.

Although a projector is exemplified as an image displaying apparatus (image projecting apparatus) according to an embodiment of the invention in the following description, the image displaying apparatus according to the invention is not limited to the projector. For example, the deterioration in image quality due to the shift of the display positions of display sub pixels corresponding to sub pixels can occur in various image displaying apparatuses as well as the projector. Accordingly, the image displaying apparatus according to the invention is not limited to the projector.

Figure 1:
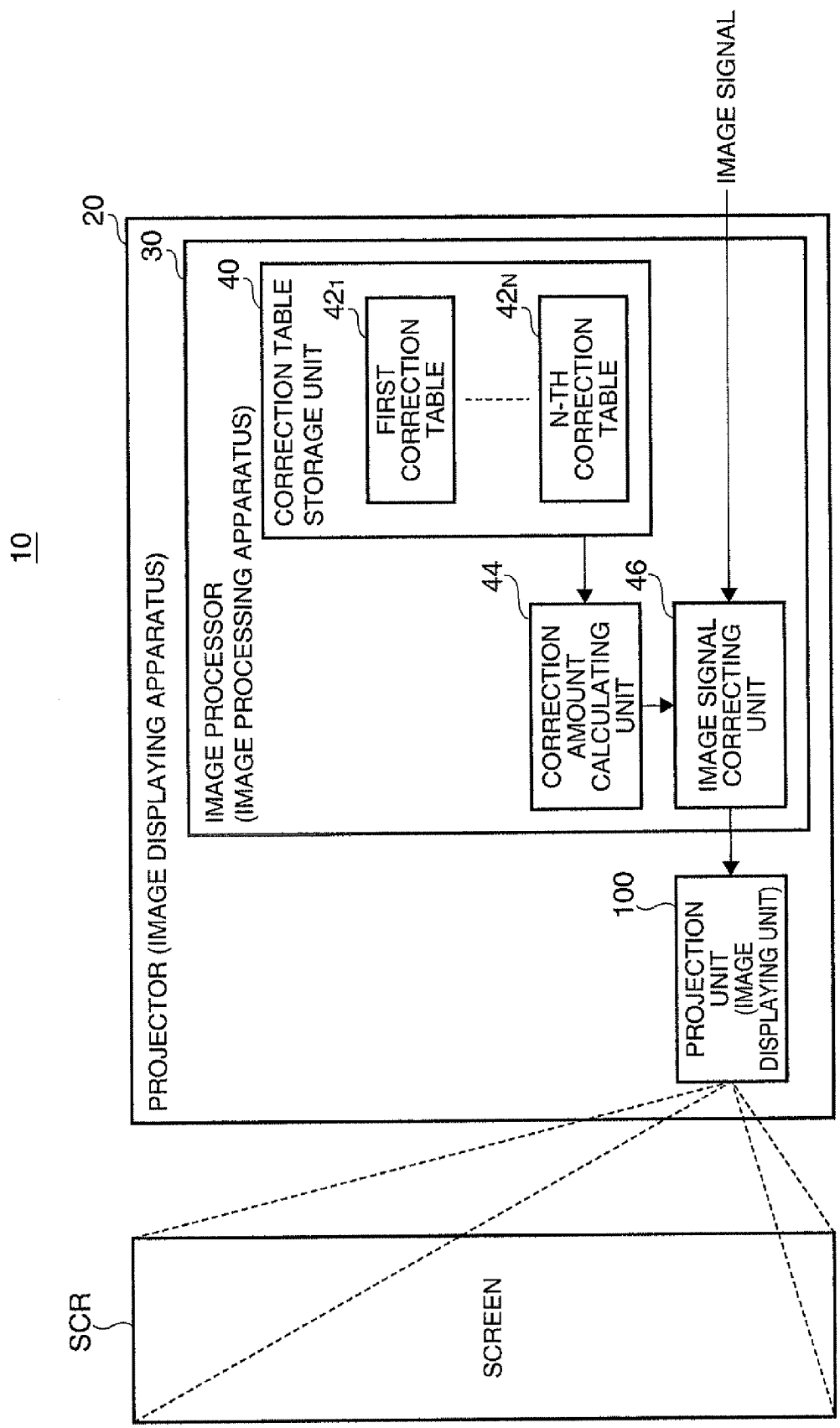
FIG. 1 is a block diagram illustrating the configuration of an image displaying system including a projector according to an embodiment of the invention.

FIG. 1 is a block diagram illustrating the configuration of an image displaying system, including the projector, as the image displaying apparatus according to an embodiment of the invention.

The image displaying system 10 according to this embodiment includes a projector 20 and a screen SCR. The projector 20 displays an image by projecting modulated light onto the screen SCR on the basis of the image signals corresponding plural color components. Here, one pixel of an input image includes plural sub pixels corresponding to plural color components. A display pixel constituting a display image projected onto the screen SCR includes plural display sub pixels corresponding to the plural sub pixels constituting one pixel.

The projector 20 includes an image processor 30 as an image processing apparatus and a projection unit 100 as an image display unit.

The image processor 30 performs a geometric correction process (shape correcting process) of the display image projected onto the screen SCR on the image signals corresponding to pixel values of the sub pixels by color components (by sub pixels). The image processor 30 can perform a pixel shift correcting process corresponding to the amount of pixel shift in the display position of the display sub pixels constituting each display pixel in the display image at the same time as performing the geometric correction process. The image signals are generated by an image signal generating device not shown and are supplied to the image processor 30.

The projection unit 100 modulates beams from the light source by color components on the basis of the image signals corrected by the image processor 30, synthesizes the modulated beams of the color components, and projects the synthesized beams onto the screen SCR so as to superpose the display sub pixels on each other. Accordingly, it is possible to correct the shape of the image projected onto the screen SCR and to suppress the deterioration in image quality due to the pixel shift.

The image processor 30 includes a correction table storage unit 40, a correction amount calculating unit 44, and an image signal correcting unit 46. The correction table storage unit 40 stores one or more correction tables. Each correction table includes correction data corresponding to the correction amounts of the image signals of the color components. The correction amount calculating unit 44 calculates the correction amount of the image signal of the respective color components on the basis of the correction tables specified by color components out of the correction tables stored in the correction table storage unit 40. The image signal correcting unit 46 independently corrects the image signals using the correction amounts calculated by the correction amount calculating unit 44 among the color components and makes a geometric correction of the display image formed by the display pixels displayed so as to superpose the display sub pixels corresponding to the sub pixels. The image signals having been subjected to the geometric correction by the image signal correcting unit 46 are output to the projection unit 100.

Here, when one pixel includes the sub pixels of N (where N is an integer of 2 or greater) color components, the correction table storage unit 40 can store one or more correction tables and the first to N-th corrections tables $42_1$ to $42_N$ in maximum are individually referred to at the same time. By employing correction data corresponding to the amount to be geometrically corrected, the amount of the pixel shift, and other amounts to be corrected as the correction data included in the correction tables, what correction table to refer to can be specified for each color component and the image signal correcting unit 46 can simultaneously perform plural correction processes on the image signals of the color components.

For example, the correction table storage unit 40 stores a correction table corresponding to the amount of pixel shift of the display position of the display sub pixels and the amount of geometric correction of the display image formed by the display pixels and the correction amount calculating unit 44 calculates the correction amounts on the basis of the correction table. The image signal correcting unit 46 corrects the image signals so as to make a geometric correction of the display image and corrects the pixel shift corresponding to the amount of pixel shift, on the basis of the correction amount calculated by the correction amount calculating unit 44. Accordingly, without an individual geometric correction circuit and a pixel shift correcting circuit and without sequentially performing the correction processes, it is possible to make both a geometric correction and a correction of the pixel shift with a small-sized configuration.

It is preferable that the correction tables stored in the correction table storage unit 40 include correction data on plural representative pixels (representative points) in one screen of the display image. In this case, the correction amount calculating unit 44 calculates the correction data of the sub pixel positions by the interpolation process using the correction data of the correction tables. In this way, the correction amount calculating unit 44 can calculate the correction amounts of all the pixels in one screen.

Although it will be described in the following that N is "3" and one pixel includes sub pixels of the R component, the G component, and the B component, this embodiment is not limited to the number of color components constituting one pixel.

Figure 2:
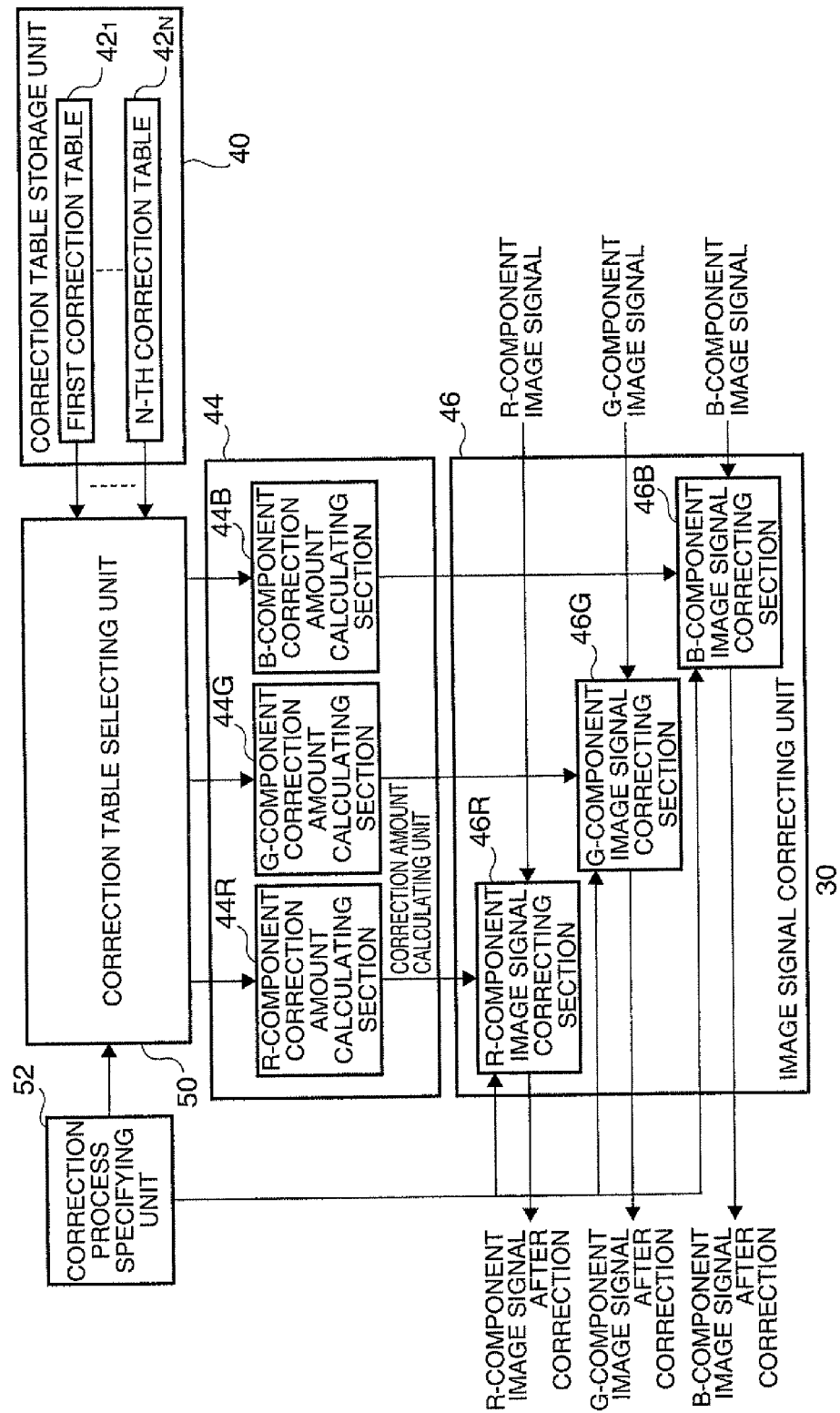
FIG. 2 is a block diagram illustrating the configuration of an image processor according to the embodiment in detail.

FIG. 2 is a block diagram illustrating the detailed configuration of the image processor 30 according to this embodiment. In FIG. 2, the same elements as shown in FIG. 1 are referenced by the same reference numerals and a description thereof is properly omitted.

The image processor 30 in this embodiment further includes a correction table selecting unit 50 and a correction process specifying unit 52, in addition to the correction table storage unit 40, the correction amount calculating unit 44, and the image signal correcting unit 46 shown in FIG. 1.

The correction table selecting unit 50 selects the correction table specified by the correction process specifying unit 52 for each color component out of the first to third (=N) correction tables $42_1$ to $42_3$ stored in the correction table storage unit 40. The correction table selecting unit 50 outputs the correction data of the specified correction table to the correction amount calculating unit 44 for each color component.

The correction process specifying unit 52 specifies one of the first to third correction tables $42_1$ to $42_3$ stored in the correction table storage unit 40 for each color component. The correction process specifying unit 52 may specify a correction table common to plural color components or may specify correction tables different by color components.

The correction process specifying unit 52 specifies ON or OFF of a correction process for each color component. The image signal of the color component of which the correction process is specified as ON is subjected to the correction process. The image signal of the color component of which the correction process is specified as OFF is not subjected to the correction process. The correction process specifying unit 52 may specify the ON of the correction process on one or more color components or may specify the OFF of the correction process on one or more color components.

The correction amount calculating unit 44 includes an R-component correction amount calculating section 44R, a G-component correction amount calculating section 44G, and a B-component correction amount calculating section 44B and calculates the correction amount of each color component. The R-component correction amount calculating section 44R, the G-component correction amount calculating section 44G, and the B-component correction amount calculating section 44B calculate the correction amount on the basis of the correction table selected by the correction table selecting unit 50.

The image signal correcting unit 46 includes an R-component image signal correcting section 46R, a G-component image signal correcting section 46G, and a B-component image signal correcting section 468 and can correct the image signals of the respective color components. The section of which the ON is specified by the correction process specifying unit 52 out of the R-component image signal correcting section 46R, the G-component image signal correcting section 46G, and the B-component image signal correcting section 46B performs a correction process on the image signal of the corresponding color component using the correction amount calculated by the corresponding color-component correction amount calculating section. The section of which the OFF is specified by the correction process specifying unit 52 out of the R-component image signal correcting section 46R, the G-component image signal correcting section 46G, and the B-component image signal correcting section 46B does not perform a correction process on the image signal of the corresponding color component.

By this configuration, the correction amount of the respective color components is calculated on the basis of the specified correction table and the image signals are independently corrected among the color components.

The projection unit 100 is supplied with the image signals subjected to the correction process by the image processor 30. The projection unit 100 is constructed by, for example, a 3-panel liquid crystal projector and projects an image onto the screen SCR on the basis of the image signals of the sub pixels constituting one pixel. More specifically, the projection unit 100 modulates light from a light source not shown and projects the modulated light onto the screen SCR on the basis of the image signals corrected by the image processor 30.

Figure 3:
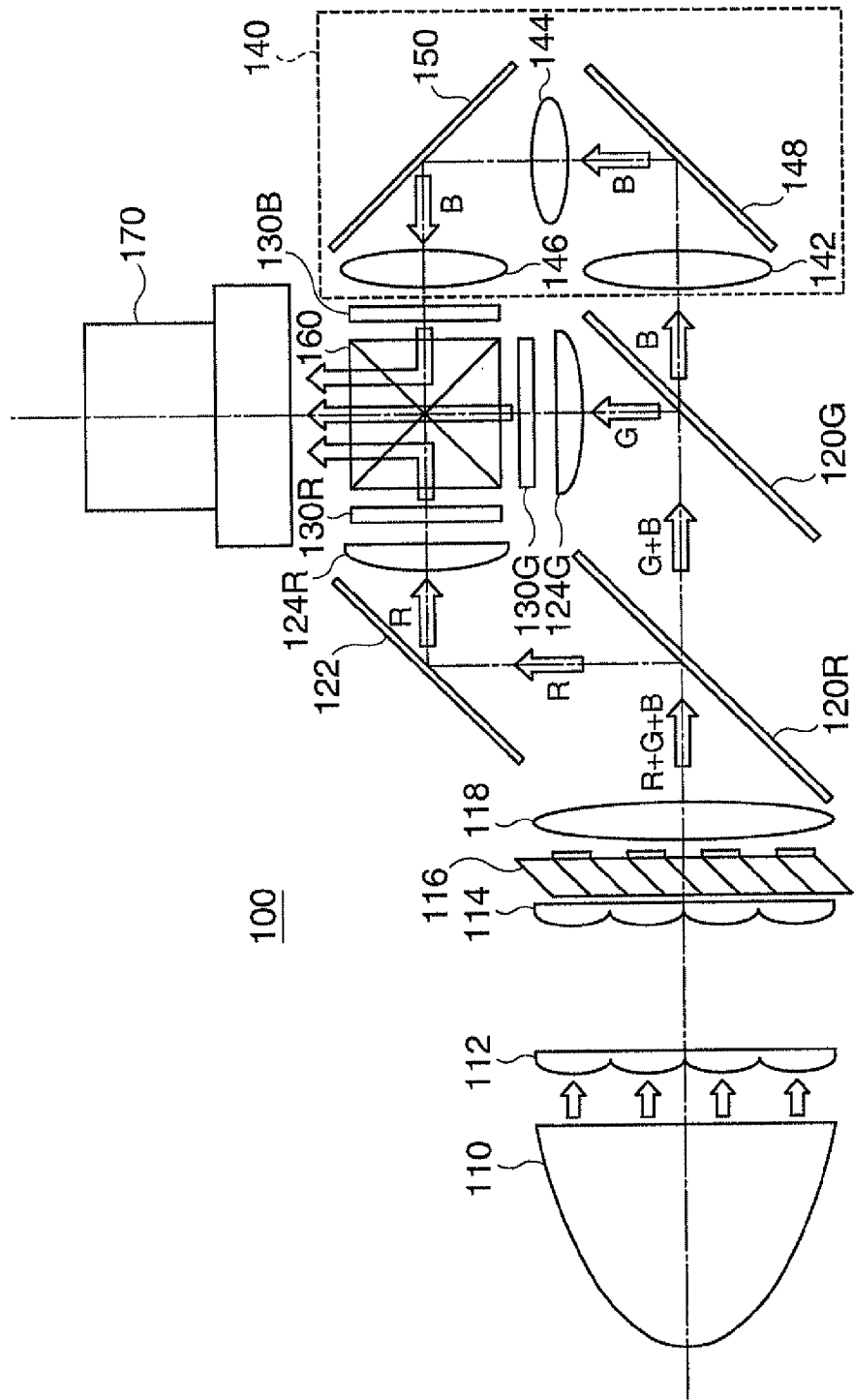
FIG. 3 is a diagram illustrating the configuration of a projection unit.

FIG. 3 is a diagram illustrating the configuration of the projection unit 100 shown in FIG. 1. In FIG. 3, the projection unit 100 in this embodiment is constructed by the 3-panel liquid crystal projector, but the projection unit of the image displaying apparatus according to the invention is not limited to the 3-panel liquid crystal projector.

The projection unit 100 includes a light source 110, integrator lenses 112 and 114, a polarization converting device 116, a superposing lens 118, an R-component dichroic mirror 120R, a G-component dichroic mirror 120G, a reflecting mirror 122, an R-component field lens 124R, a G-component field lens 124G, an R-component liquid crystal panel 130R (first light modulating device), a G-component liquid crystal panel 130G (second light modulating device), a B-component liquid crystal panel 130B (third light modulating device), a relay optical system 140, a cross dichroic prism 160, and a projection lens 170. The liquid crystal panels used as the R-component liquid crystal panel 130R, the G-component liquid crystal panel 130G, and the B-component liquid crystal panel 130B are transmissive liquid crystal display devices. The relay optical system 140 includes relay lenses 142, 144, and 146 and reflective mirrors 148 and 150.

The light source 110 includes, for example, an ultrahigh-pressure mercury lamp and emits light including at least an R-component beam, a G-component beam, and a B-component beam. The integrator lens 112 includes plural small lenses for dividing the light from the light source 110 into plural partial beams. The integrator lens 114 includes plural small lenses corresponding to the small lenses of the integrator lens 112. The superposing lens 118 superposes the partial beams emitted from the small lenses of the integrator lens 112 on the liquid crystal panels.

The polarization converting device 116 includes a polarization beam splitter array and a λ/2 plate and converts the light from the light source 110 substantially into one kind of polarized light. The polarization beam splitter array has a structure in which a polarization dividing film for dividing the partial beams divided by the integrator lens 112 into p-polarized beams and s-polarized beams and a reflecting film for changing the traveling direction of the light from the polarization dividing film are alternately arranged. Two kinds of polarized beams divided by the polarization dividing film are arranged to be equal in the polarization direction by the λ/2 plate. The light converted substantially into one kind of polarized light by the polarization converting device 116 is input to the superposing lens 118.

The light from the superposing lens 118 is input to the R-component dichroic mirror 120R. The R-component dichroic mirror 120R has a function of reflecting the R-component beam and transmitting the G-component beam and the B-component beam. The light transmitted by the R-component dichroic mirror 120R is input to the G-component dichroic mirror 120G and the light transmitted by the R-component dichroic mirror 120R is reflected by the reflecting mirror 122 and guided to the R-component field lens 124R.

The G-component dichroic mirror 120G has a function of reflecting the G-component beam and transmitting the B-component beam. The light transmitted by the G-component dichroic mirror 120G is input to the relay optical system 140 and the light reflected by the G-component dichroic mirror 120G is guided to the G-component field lens 124G.

In the relay optical system 140, the length difference between the optical paths is corrected using the relay lenses 142, 144, and 146 so as to reduce the length difference between the optical path of the B-component beam transmitted by the G-component dichroic mirror 120G and the optical paths of the R-component beam and the G-component beam so as to be as small as possible. The light passing through the relay lens 142 is guided to the relay lens 144 by the reflecting mirror 148. The light passing through the relay lens 144 is guided to the relay lens 146 by the reflecting mirror 150. The light passing through the relay lens 146 is input to the B-component liquid crystal panel 130B.

The light input to the R-component field lens 124R is converted into parallel light and is input to the R-component liquid crystal panel 130R. The R-component liquid crystal panel 130R serves as a light modulating device (light modulating unit) and changes its transmittance (transmission rate, modulation rate) on the basis of the R-component image signal. Therefore, the light (first color-component beam) input to the R-component liquid crystal panel 130R is modulated on the basis of the R-component image signal corrected by the image processor 30 and the modulated light is input to the cross dichroic prism 160.

The light input to the G-component field lens 124G is converted into parallel light and is input to the G-component liquid crystal panel 130G. The G-component liquid crystal panel 130G serves as a light modulating device (light modulating unit) and changes its transmittance (transmission rate, modulation rate) on the basis of the G-component image signal. Therefore, the light (second color-component beam) input to the G-component liquid crystal panel 130G is modulated on the basis of the G-component image signal corrected by the image processor 30 and the modulated light is input to the cross dichroic prism 160.

The B-component liquid crystal panel 130B to which the light converted into parallel light by the relay lenses 142, 144, and 146 is input serves as a light modulating device (light modulating unit) and changes its transmittance (transmission rate, modulation rate) on the basis of the B-component image signal. Therefore, the light (third color-component beam) input to the B-component liquid crystal panel 130B is modulated on the basis of the B-component image signal corrected by the image processor 30 and the modulated light is input to the cross dichroic prism 160.

The R-component liquid crystal panel 130B, the O-component liquid crystal panel 130G, and the B-component liquid crystal panel 130B have the same configuration. Each liquid crystal panel is constructed by sealing a liquid crystal, as an electro-optical material, between a pair of transparent glass substrates and modulates the transmittance of the color-component beams in response to the image signals of the sub pixels, for example, using a polysilicon thin film transistor as a switching element.

The cross dichroic prism 160 has a function of outputting as an output beam a synthesized beam obtained by synthesizing the input beams from the R-component liquid crystal panel 130R, the G-component liquid crystal panel 130G, and the B-component liquid crystal panel 130B. The projection lens 170 is a lens for extending and focusing the output image onto the screen SCR and has a function of extending or reducing an image in accordance with a zoom magnification.

The geometric correction and the pixel shift correction according to this embodiment will be described now.

Figure 4A:
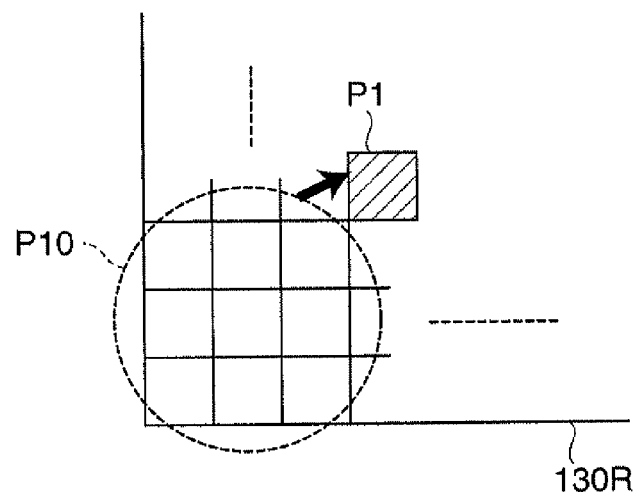
FIGS. 4A and 4B are diagrams illustrating a geometric correction process according to the embodiment of the invention.
Figure 4B:
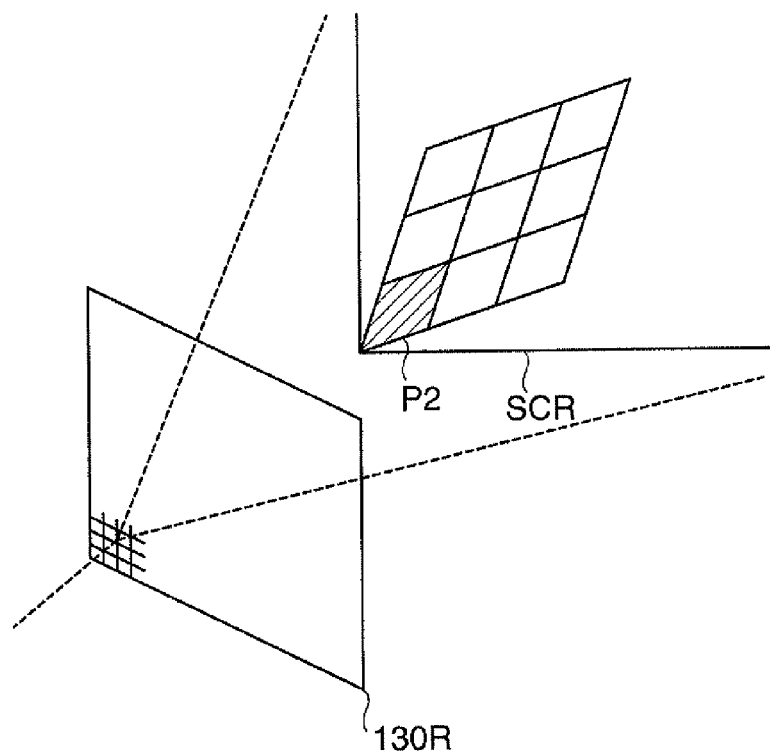

FIGS. 4A and 4B are diagrams illustrating the geometric correction process according to this embodiment. FIG. 4A schematically shows pixels (sub pixels) of the R-component liquid crystal panel 130R. FIG. 4B schematically shows an image displayed on the screen SCR using a beam modulated by the R-component liquid crystal panel 130R.

Figure 5:
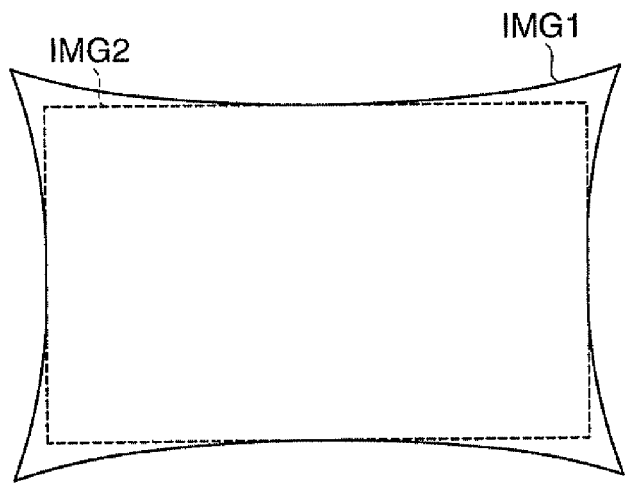
FIG. 5 is a diagram schematically illustrating the shapes of a display image before and after the geometric correction according to the embodiment of the invention.

FIG. 5 is a diagram schematically illustrating the shape of a display image before and after the geometric correction in this embodiment.

For example, depending on the positional relation between the body of the projector 20 and the screen SCR as shown in FIG. 4A, the shape of the display image projected onto the screen SCR is distorted as shown in FIG. 4B. This results from, for example, the optical characteristic (geometric aberration) of the projection lens. Therefore, for example, the image signal of sub pixel P1 of FIG. 4A corresponding to display sub pixel P2 of FIG. 4B is calculated by an interpolation process using the image signals of one or more sub pixels (for example, a sub pixel group P10 in FIG. 4A) around sub pixel P1 and is output as the image signal of sub pixel P1 after the geometric correction. The R-component liquid crystal panel 130R of the projection unit 100 modulates the light from the light source using the corrected image signal corresponding to sub pixel P1 and projects the modulated light onto the screen SCR.

As a result, for example, the shape of the projection image IMG1 before the geometric correction is corrected to that of the projection image IMG2 after the geometric correction as shown in FIG. 5 and it is thus possible to display a proper display image depending on the positional relation between the projector 20 and the screen SCR.

Although the R-component display sub pixel is exemplified in FIGS. 4A and 4B and FIG. 5, the same is true in the G component and the B component. Although the geometric correction due to the positional relation between the projector 20 and the screen SCR or the geometric aberration of the projection lens is exemplified, the same is true in the case where the geometric correction is made due to the direction of the projection plane of the screen SCR about the projector 20.

In this way, the geometric correction is made due to, for example, the positional relation between the body of the projector 20 and the screen SCR or the geometric aberration of the projection lens, but the pixel shift correction is made due to, for example, the installation precision or the chromatic aberration of the optical components.

Figure 6:
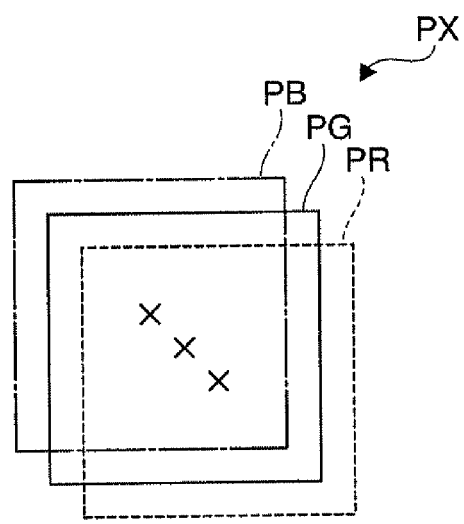
FIG. 6 is a diagram schematically illustrating a display pixel constituting a display image projected onto a screen by the projection unit shown in FIG. 3.

FIG. 6 is a diagram schematically illustrating a display pixel forming a display image projected onto the screen SCR by the projection unit 100 shown in FIG. 3.

The display pixel PX forming the display image projected onto the screen SCR includes an R-component display sub pixel PR corresponding to the sub pixel of the R-component liquid crystal panel 130R, a G-component display sub pixel PG corresponding to the sub pixel of the G-component liquid crystal panel 130G, and a B-component display sub pixel PB corresponding to the sub pixel of the B-component liquid crystal panel 130B. The projection unit 100 projects the light beams so as to superpose the R-component display sub pixel PR, the G-component display sub pixel PG, and the B-component display sub pixel PB.

Since the projection unit 100 has the configuration shown in FIG. 3, the shift in the display position of a display sub pixel on the screen SCR may occur due to the chromatic aberration of the optical system or the adjustment precision of positioning means of constituent members of the optical system. Therefore, depending on the amount of pixel shift in the display position of the display sub pixel, the image signal of the sub pixel corresponding to the display sub pixel is calculated by the interpolation process using the image signals of one or more sub pixels around the sub pixel and is output as the image signal of the sub pixel after the correction of the pixel shift. Accordingly, even when the shift in the display position of a display sub pixel occurs, it is possible to suppress the deterioration in resolution or the occurrence of false colors, for example, in the edge portion or the end portion of the display image and thus to suppress the deterioration in image quality of the display image.

Operations of the correction amount calculating unit 44 and the image signal correcting unit 46 performing the above-mentioned correction process will be described now.

Figure 7:
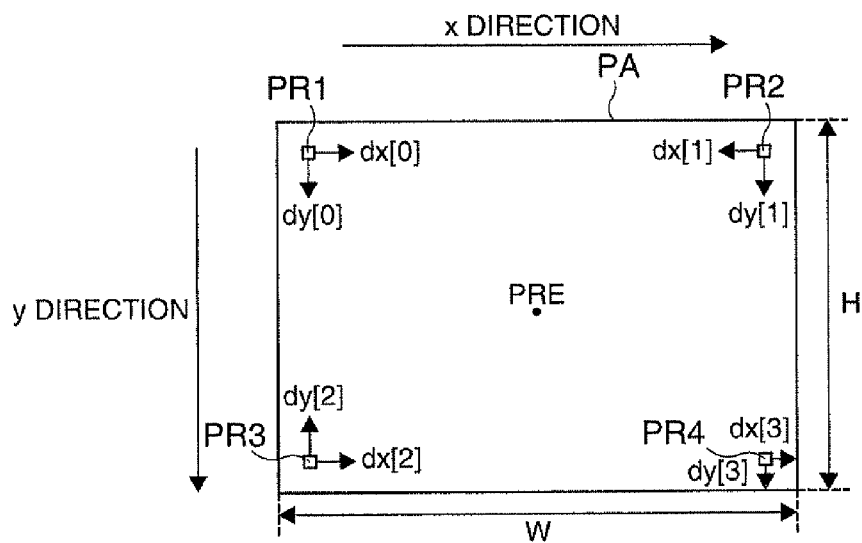
FIG. 7 is a diagram illustrating the operation of an R-component correction amount calculating section shown in FIG. 2.

FIG. 7 is a diagram illustrating the operation of the R-component correction amount calculating section 44R shown in FIG. 2.

Here, it is assumed that the correction table corresponding to the amount of pixel shift in the display position of the R-component display sub pixel is stored in the correction table storage unit 40 and the R-component correction amount calculating unit 44R calculates the correction amount on the basis of the correction table. Although the R-component correction amount calculating section 44R is exemplified in FIG. 7, the same is true in the G-component correction amount calculating section 44G and the B-component correction amount calculating section 44B.

FIG. 7 shows a projection area PA of a display image (where the number of pixels in the horizontal direction is W and the number of pixels in the vertical direction is H) projected by the projection unit 100. The correction table selected by the correction table selecting unit 50 out of the correction tables stored in the correction table storage unit 40 includes correction data corresponding to the amounts of pixel shift in the display position of the display sub pixels constituting display pixels in or around four corners of the display image.

In FIG. 7, the amounts of pixel shift in the display position of the R-component display sub pixels PR1 to PR4 are schematically shown. The amount of pixel shift includes an amount of pixel shift dx in the x direction as the horizontal direction and an amount of pixel shift dy in the y direction as the vertical direction. That is, the correction table referred to by the R-component correction amount calculating section 44R includes the amount of pixel shift dx[0] in the x direction and the amount of pixel shift dy[0] in the y direction as the amount of pixel shift in the display position of the display sub pixel PR1.

Here, it is preferable that the amount of pixel shift in the display position of the display sub pixel is normalized as follows.

Figure 8:
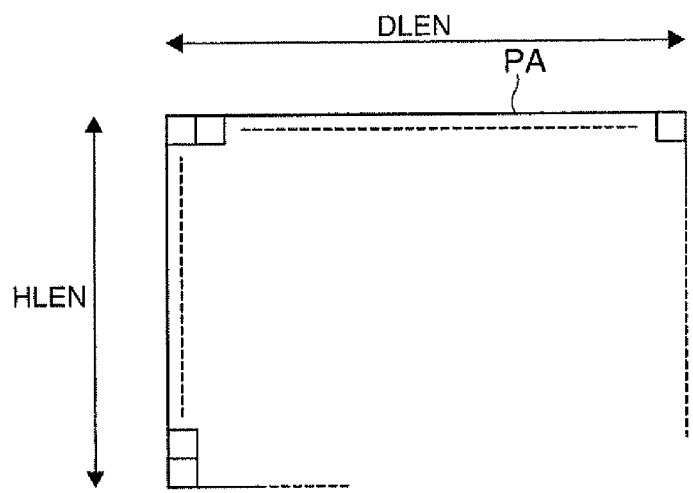
FIG. 8 is a diagram illustrating an amount of pixel shift in the display position of display sub pixels according to the embodiment.

FIG. 8 is a diagram illustrating the amounts of pixel shift in the display position of the display sub pixels in this embodiment. In FIG. 8, the same elements as shown in FIG. 7 are referenced by the same reference numerals and signs and the description thereof is properly omitted.

The size of the projection area PA of the display image projected by the projection unit 100 of the projector 20 is uniquely determined. Therefore, when the length of the projection area PA in the horizontal direction is DLEN and the number of pixels in the horizontal direction is D, it can be specified to how many pixels the amount of pixel shift in the x direction corresponds by calculating the amount of pixel shift using DLEN/D as a unit. Similarly, when the length of the projection area PA in the vertical direction is HLEN and the number of pixels in the vertical direction is H, it can be specified to how many pixels the amount of pixel shift in the y direction corresponds by calculating the amount of pixel shift using HLEN/H as a unit.

By using the amount of pixel shift dx[0] and dy[0] of the display sub pixel PR1, the amount of pixel shift dx[1] and dy[1] of the display sub pixel PR2, the amount of pixel shift dx[2] and dy[2] of the display sub pixel PR3, and the amount of pixel shift dx[3] and dy[3] of the display sub pixel PR4, which are normalized, the R-component correction amount calculating section 44R calculates the amount of pixel shift in the x direction x_shift and the amount of pixel shift in the y direction y_shift of the display sub pixel PRE in the projection area PA.

More specifically, the R-component correction amount calculating section 44R calculates the amount of pixel shift in the x direction x_shift(x,y) of the display sub pixel PRE located at the coordinate (x,y) using the left-upper corner of the projection area PA on the basis of the amounts of pixel shift dx[0] to dx[3]. At this time, the R-component correction amount calculating section 44R calculates the amount of pixel shift x_shift(x,y) by a linear interpolation process expressed by the following expression.

$$x\_shift(x, y) = \left(1 - \frac{y}{H-1}\right) \cdot \left\{\left(1 - \frac{x}{W-1}\right) \cdot dx[0] + \left(\frac{x}{W-1}\right) \cdot dx[1]\right\} + \\ \left(\frac{y}{H-1}\right) \cdot \left\{\left(1 - \frac{x}{W-1}\right) \cdot dx[2] + \left(\frac{x}{W-1}\right) \cdot dx[3]\right\} \quad (1)$$

Similarly, the R-component correction amount calculating section 44R calculates the amount of pixel shift in the y direction y_shift(x,y) of the display sub pixel PRE located at the coordinate (x,y) using the left-upper corner of the projection area PA on the basis of the amounts of pixel shift dy[0] to dy[3].

$$y\_shift(x, y) = \left(1 - \frac{x}{H-1}\right) \cdot \left\{\left(1 - \frac{y}{W-1}\right) \cdot dy[0] + \left(\frac{y}{W-1}\right) \cdot dy[1]\right\} + \\ \left(\frac{x}{H-1}\right) \cdot \left\{\left(1 - \frac{y}{W-1}\right) \cdot dy[2] + \left(\frac{y}{W-1}\right) \cdot dy[3]\right\} \quad (2)$$

As described above, it is possible to calculate the correction amount to be used in the correction of pixel shift in a unit smaller than one pixel by performing the interpolation process using the amounts of pixel shift at representative points. Therefore, it is possible to perform a correction process with high precision and thus to further prevent the deterioration in image quality.

Although it is exemplified in FIGS. 7 and 8 that the amounts of pixel shift of the R-component display sub pixels in the projection area PA, the amounts of pixel shift of the G-component display sub pixels and the B-component display sub pixels in the projection area PA can be calculated in the same way. Accordingly, even when the correction table storage unit 40 stores only the correction data corresponding to the amounts of pixel shift of four corners of the projection area PA used in the pixel shift correcting process, the respective sections of the correction amount calculating unit 44 can calculate the amounts of pixel shift of all the display sub pixels in the projection area PA.

However, it is preferable that the correction tables referred to by the sections of the correction amount calculating unit 44, at the time of correcting the pixel shift, include the correction data corresponding to the amounts of pixel shift in display position of the R-component display sub pixels and the correction data corresponding to the amounts of pixel shift in display position of the B-component display sub pixels relative to the display positions of the G-component display sub pixels. In this case, the pixel shift correction process of the G-component correction amount calculating section 44G can be omitted. When the sections of the correction amount calculating unit 44 calculate only the correction amounts used in the pixel shift correcting process, it is possible to reduce the capacity of the correction table referred to by the sections of the correction amount calculating unit 44.

Although it is exemplified in FIGS. 7 and 8 that the correction tables stored in the correction table storage unit 40 include correction data corresponding to the amounts of pixel shift in the display position of the display sub pixels constituting the display pixels in or around four corners of the display image, the embodiment is not limited to this configuration. Only the correction data corresponding to the amounts of pixel shift in the display position of plural display sub pixels corresponding to plural sub pixels around the sub pixel of which the correction amount should be calculated can be included in the correction tables stored in the correction table storage unit 40. For example, the correction data corresponding to the amounts of pixel shift of plural representative points in one line in the horizontal direction of the display image or the correction data corresponding to the amounts of pixel shift of plural representative points in one line in the vertical direction of the display image may be included therein.

Although it is exemplified in FIGS. 7 and 8 that the sections of the correction amount calculating unit 44 calculate the correction amounts to be used in the pixel shift correcting process, the correction amounts to be used in the geometric correction process can be calculated in the same way. In this case, at plural representative points in one screen the correction tables stored in the correction table storage unit 40 include the correction data corresponding to the amounts to be subjected to the geometric correction and the sections of the correction amount calculating unit 44 calculate the correction amounts to be used in the geometric correction process as described above.

For example, the correction tables corresponding to the amounts of pixel shift in the display position of the display sub pixels and the geometric correction amounts of the display image formed by the display pixels can be stored in the correction table storage unit 40. In this case, for example, the summed value of the x component of the amount of pixel shift and the x component of the geometric correction amount and the summed value of the y component of the amount of pixel shift and the y component of the geometric correction amount can be stored in the correction tables. The sections of the correction amount calculating unit 44 can calculate the correction amounts on the basis of the correction table, thereby obtaining the correction amounts to be used in the pixel shift correcting process and the correction amounts to be used in the geometric correction process.

Figure 9:
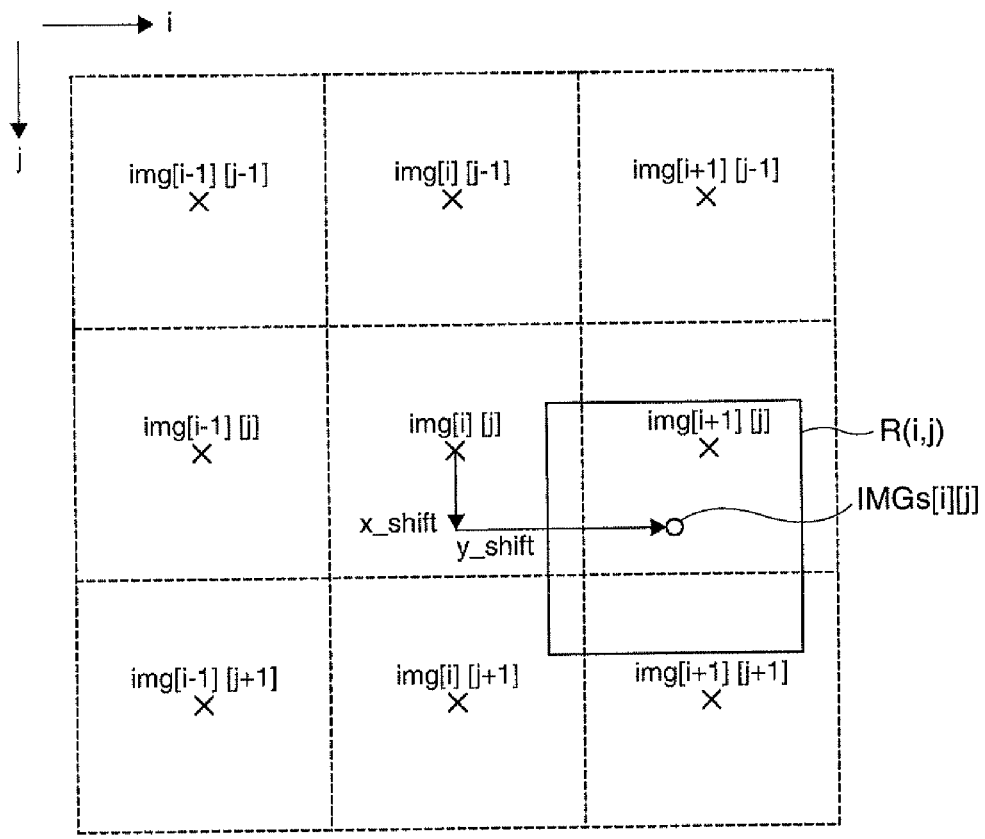
FIG. 9 is a diagram illustrating the operation of an R-component image signal correcting section shown in FIG. 2.

FIG. 9 is a diagram illustrating the operation of the R-component image signal correcting section 46R shown in FIG. 2.

Although the R-component image signal correcting section 46R is shown in FIG. 9, the same is true in the G-component image signal correcting section 46G and the B-component image signal correcting section 46B.

FIG. 9 shows a process of correcting the pixel value IMGs[i][j] of the sub pixel R(i,j) corresponding to the R-component display sub pixel. In FIG. 9, R-component sub pixels around the R-component sub pixel R(i,j) defined in the coordinate system using the left-upper corner of the projection area as an origin are schematically shown. Here, for example, the R-component sub pixel R(i−1,j−1) has a pixel value of img[i−1][j−1] and the R-component sub pixel R(i,j+1) has a pixel value of img[i][j+1].

The display position of the display sub pixel corresponding to the sub pixel R(i,j) in FIG. 9 is shifted by an x_shift in the x direction and by a y_shift in the y direction from the display position of the display sub pixel corresponding to the G-component sub pixel. The correction data (parameter) corresponding to this amount of pixel shift is read from the correction table stored in the correction table storage unit 40 or is calculated by the R-component correction amount calculating section 44R described with reference to FIGS. 7 and 8.

The R-component image signal correcting section 46R calculates the pixel value IMGs[i][j] of the sub pixel R(i,j) by an area gray-scale method using the pixel values of the sub pixels (sub pixels adjacent in the x direction and sub pixels adjacent in the y direction) around the sub pixel R(i,j) on the basis of the correction data (parameter) corresponding to the amounts of pixel shift and outputs the pixel value IMGs[i][j] as the corrected image signal to the projection unit 100.

$$IMGs[i][j]=(1-y\_shift)\cdot\{(1-x\_shift)\cdot img[i][j]+x\_shift\cdot img[i+1][j]\}+y\_shift\cdot\{(1-x\_shift)\cdot img[i][j+1]+x\_shift\cdot img[i+1][j+1]\} \quad (3)$$

The sections of the image signal correcting unit 46 can correct the image signal of one sub pixel by interpolating the image signal of the one sub pixel and the image signals corresponding to one or more sub pixels around the one sub pixel on the basis of the correction tables. Accordingly, it is possible to correct the pixel shift in a unit smaller than one pixel and thus to perform a correction process with high precision.

When the correction data included in the correction tables is the correction data corresponding to the geometric correction amounts, it is possible to correct the image signal of the sub pixel so as to make a geometric correction of the display image by the above-mentioned interpolation process. When the correction data included in the correction tables is the correction data corresponding to the amounts of pixel shift, it is possible to correct the pixel shift of the corresponding sub pixel by the interpolation process. When the correction data included in the correction table is the correction data corresponding to the geometric correction amounts and the amounts of pixel shift, it is possible to geometrically correct the sub pixel and to correct the pixel shift of the sub pixel.

The function of the image processor 30 for correcting the image signal corresponding to the sub pixel on the basis of the correction tables stored in the correction table storage unit 40 may be embodied by hardware or may be embodied by software.

Figure 10:
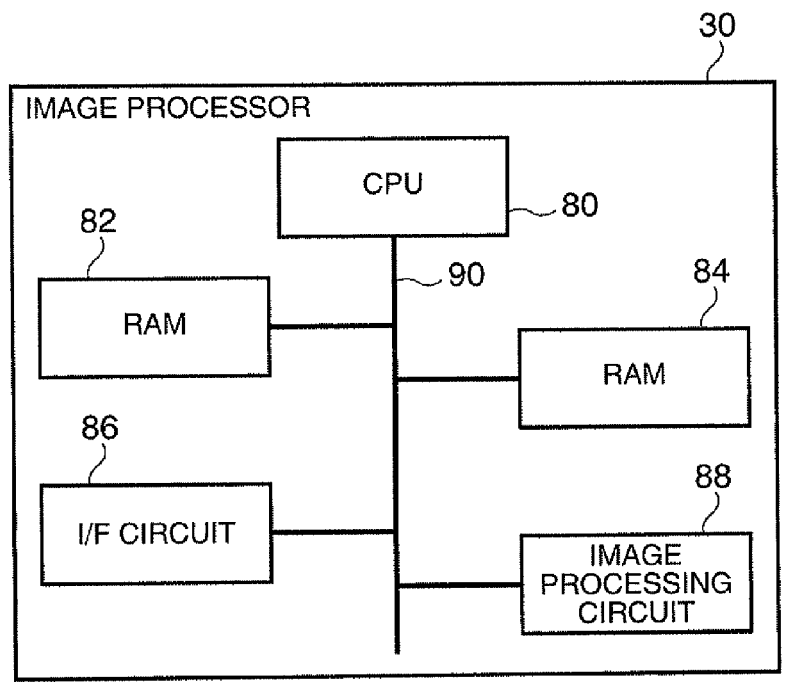
FIG. 10 is a block diagram illustrating the hardware configuration of an image processor according to the embodiment.

FIG. 10 is a block diagram illustrating a hardware configuration of the image processor 30 according to this embodiment.

The image processor 30 includes a central processing unit (CPU) 80, a read only memory (ROM) 82, a random access memory (RAM) 84, an interface (I/F) circuit 86, and an image processing circuit 88. The CPU 80, the ROM 82, the RAM 84, the I/F circuit 86, and the image processing circuit 88 are connected to each other via a bus 90.

The ROM 82 stores programs and the CPU 80 reading the programs via the bus 90 can perform processes corresponding to the programs. The RAM 84 serves as a work area for the CPU 80 or temporarily stores the programs read by the CPU 80. The I/F circuit 86 performs an interface process of inputting image signals from the outside or an interface process of outputting image signals to the projection unit 100.

The CPU 80 reads the programs stored in the ROM 82 or the RAM 84 and performs the processes corresponding to the programs. The image processing circuit 88 performs a process of correcting the image signals corresponding to the sub pixels on the basis of control data specified by the CPU 80.

The function of the correction table storage unit 40 shown in FIG. 2 is embodied by the ROM 82 or the RAM 84. The functions of the correction amount calculating unit 44, the image signal correcting unit 46, the correction table selecting unit 50, and the correction process specifying unit 52 shown in FIG. 2 are embodied by the image processing circuit 88. The CPU 80 reads the programs stored in the ROM 82 or the RAM 84 via the bus 90 and controls the image processing circuit 88 by setting the control data in the correction process specifying unit 52 in accordance with the programs. An image signal acquiring unit not shown in FIGS. 1 and 2 has a function of buffering input image signals supplied from the outside and this function is embodied by, for example, the RAM 84 or the I/F circuit 86 shown in FIG. 10.

In this embodiment, 3 (=N) types of correction tables in maximum can be allocated to a definite correction table storage area in the memory area of the ROM 82 or the RAM 84. In this embodiment, various correction processes can be performed with a simple configuration depending on the number of types of correction tables allocated in the correction table storage area.

First Processing Example

Figure 11:
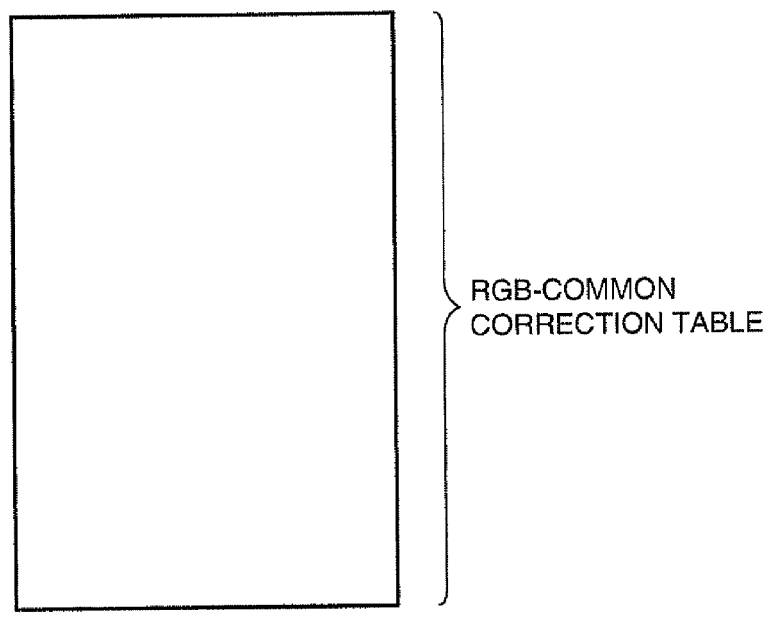
FIG. 11 is a diagram illustrating an example where a correction table storage area is allocated in a first processing example.

FIG. 11 is a diagram illustrating an example where the correction table storage area is allocated in a first processing example of this embodiment.

FIG. 11 shows an example where the entire area of the correction table storage area of the ROM 82 or the RAM 84 as the correction table storage unit 40 is allocated as a correction table storage area common to the R component, the G component, and the B component. That is, the first processing example is an example where the correction table storage unit 40 stores only one type of correction table.

In the first processing example, the same correction process can be locally or totally carried out on the R component, the G component, and the B component constituting one pixel. Therefore, the correction table in the first processing example can be constructed by correction data corresponding to the amounts of geometric correction.

In the following description, it is exemplified that the screen SCR is a so-called cylindrical screen and the shape of an image projected onto the cylindrical screen is corrected as the geometric correction.

Figure 12A:
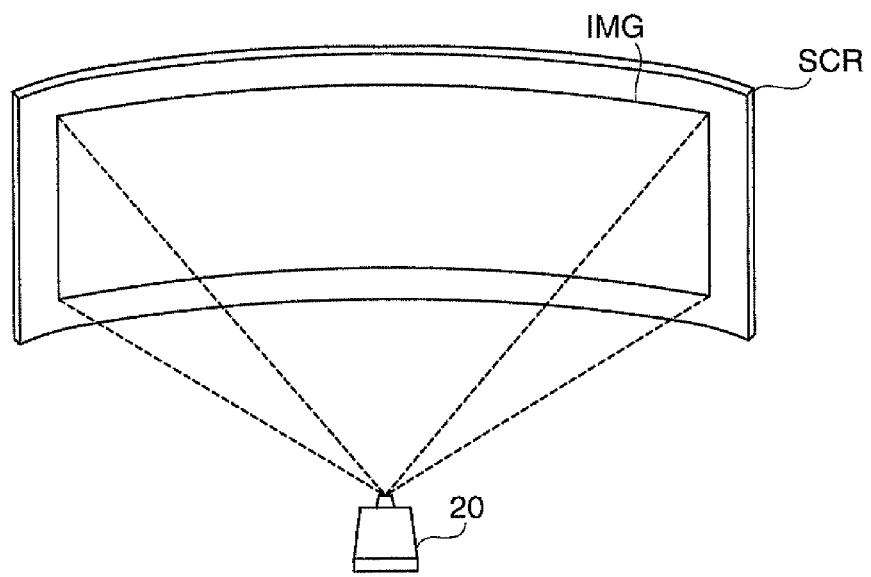
FIGS. 12A and 12B are diagrams illustrating the correction in the shape of an image projected onto a cylindrical screen.
Figure 12B:
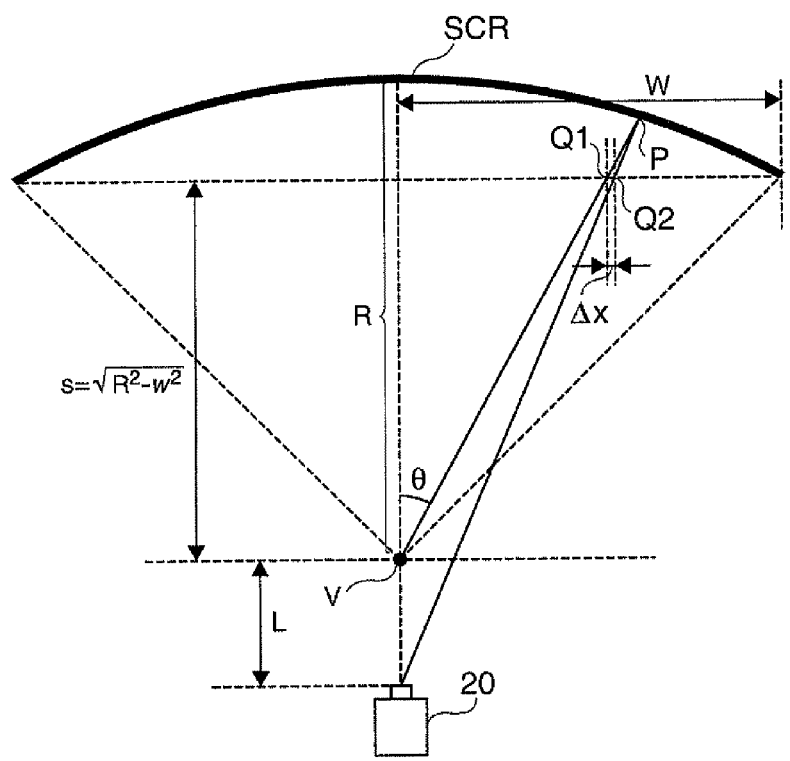

FIGS. 12A and 12B are diagrams illustrating the shape correction of the image projected onto the cylindrical screen. FIG. 12A is a diagram illustrating the cylindrical screen. FIG. 12B is a top view of FIG. 12A. In FIGS. 12A and 12B, the same portions as shown in FIG. 1 are referenced by the same reference numerals and signs and the description thereof is properly omitted. The cylindrical screen shown in FIG. 12B indicates the top view of an image projection area of the cylindrical screen shown in FIG. 12A and ends of the cylindrical screen shown in FIG. 12B indicate the ends of a projected image.

In FIGS. 12A and 12B, a point of view V is located at the center of the cylindrical screen with a radius R and the projector 20 is installed at a position backwardly apart by L from the point of view V. The width in the horizontal direction of the cylindrical screen as viewed from the point of view V is 2w. Here, when the projector 20 projects an image onto the cylindrical screen shown in FIGS. 12A and 12B, the shape of the image projected from the projector 20 and the shape of the image viewed from the point of view V are not matched with each other due to the projection surface of the cylindrical screen.

For example, when a pixel P on the cylindrical screen in the direction inclined by angle θ about the right front of the projector 20 and the point of view V is viewed from the point of view V, the pixel is recognized as a pixel located at an intersection Q1 on a virtual screen plane connecting both ends in the horizontal direction of the cylindrical screen. Accordingly, the projector 20 needs to project the pixel located at the intersection Q1 to an intersection Q2 of a line connecting the pixel P and the projector 20 and the screen plane. Therefore, the projector 20 displays an image obtained by shifting an original image by a correction amount Δx (distance between the intersection Q1 and the intersection Q2) in the horizontal direction.

Here, Δx is expressed by the following expression and the correction tables preferably include the correction data corresponding to the correction amount calculated by the following expression.

$$\Delta x = \frac{R(L + \sqrt{R^2 - w^2})\sin\theta}{R\cos\theta + L} - \sqrt{R^2 - w^2}\tan\theta \quad (4)$$

Figure 13:
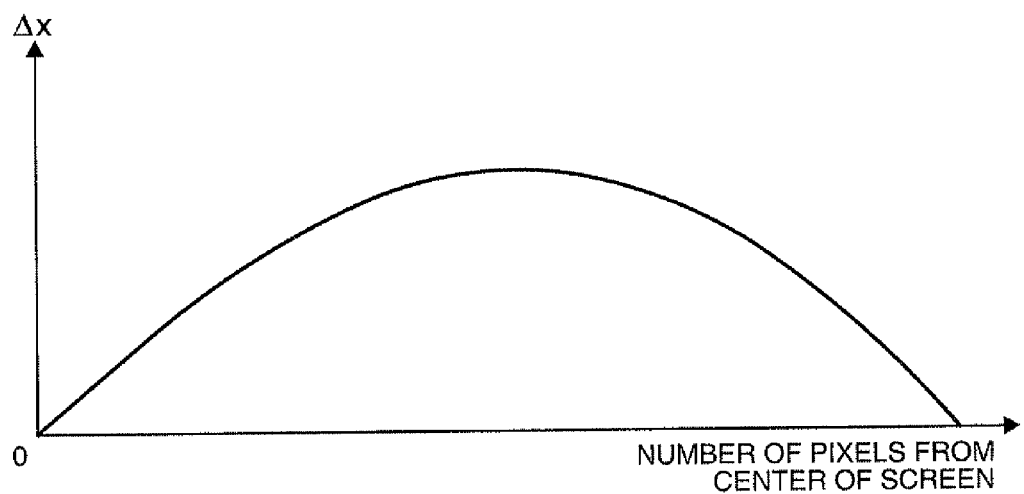
FIG. 13 is a diagram illustrating a correction amount in FIG. 12B.

FIG. 13 shows the correction amount of FIG. 12B. In FIG. 13, the horizontal axis represents the number of pixels (distance) from the center of the cylindrical screen and the vertical axis represents the correction amount Δx.

As shown in FIG. 13, in the first processing example, the correction data corresponding to such a correction amount Δx that the correction amount Δx at the center of the cylindrical screen and at the edges of the cylindrical screen is "0" and the correction amount Δx becomes greater in the vicinity of the middle pixel thereof is included in the correction table.

Figure 14:
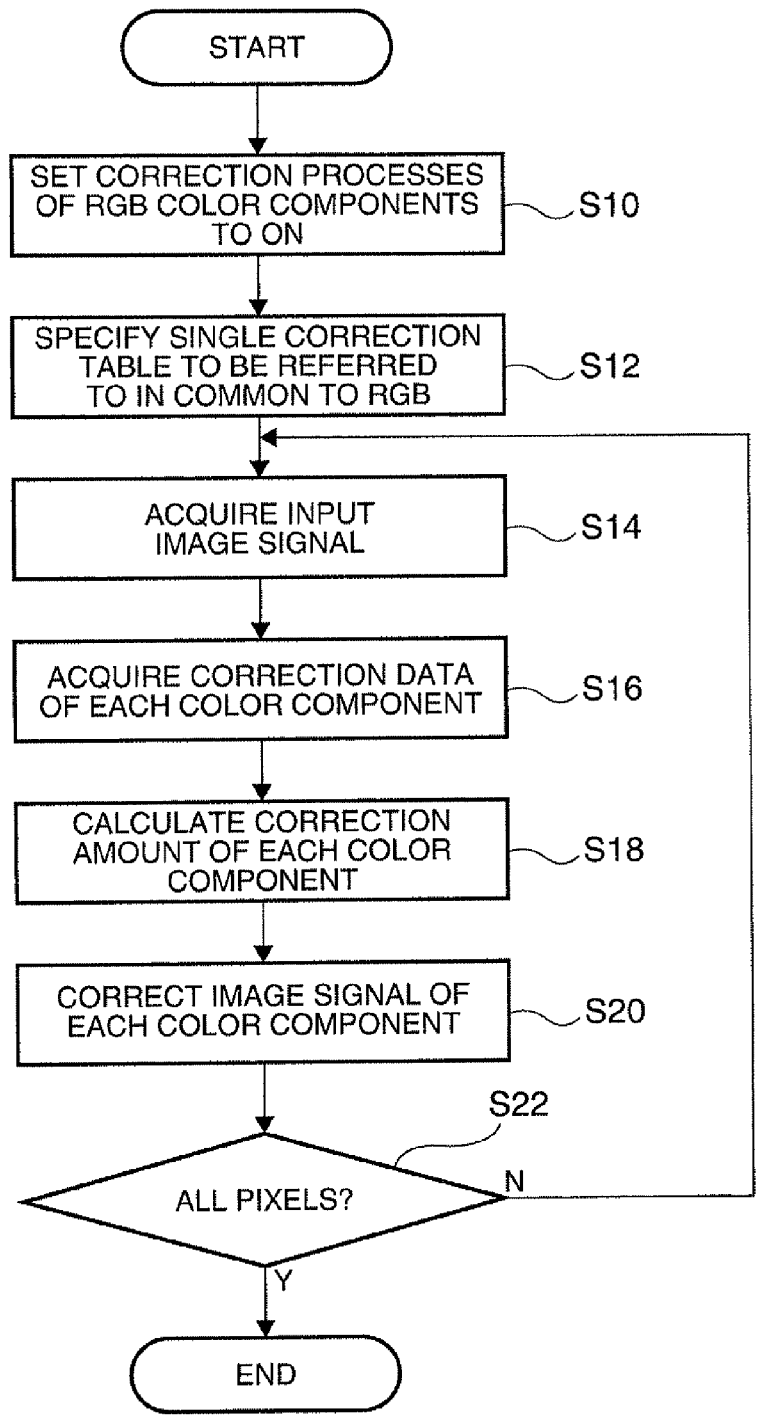
FIG. 14 is a flowchart illustrating processes of the image processor in the first processing example according to the embodiment.

FIG. 14 is a flowchart illustrating the processes of the image processor 30 in the first processing example of this embodiment.

For example, a program for embodying the processes shown in FIG. 14 is stored in the ROM 82 in advance and the processes shown in FIG. 14 can be embodied by software by allowing the CPU 80 to read the program stored in the ROM 82 and to perform the processes corresponding to the program.

First, as a correction process ON/OFF setting step performed by the correction process specifying unit 52 of the image processor 30, the CPU 80 sets the correction process of the RGB color components in the image processing circuit 88 to ON (step S10). Accordingly, the image processor 30 performs the image signal correcting process on the respective RGB color components.

As a correction table reference destination specifying step in the correction process specifying unit 52 of the image processor 30, the CPU 80 specifies which of the first to third correction tables 42₁ to 42₃ stored in the correction table storage unit 40 the image processing circuit 88 should refer to for each of the RGB color components (step S12). Here, a single correction table common to the RGB color components should be referred to.

As an input image signal acquiring step, the image processor 30 acquires image signals corresponding to the sub pixels constituting the pixels of the input image from an image signal generating device not shown (step S14).

As a correction data acquiring step in the correction table selecting unit 50 of the image processor 30, the correction data of the respective color components are acquired on the basis of the correction table common to the RGB color components and specified in step S12 (step S16).

As a correction amount calculating step in the correction amount calculating unit 44 of the image processor 30, the sections of the correction amount calculating unit 44 calculate the correction amounts of the color components (step S18). In step S18, the correction amounts of the color components are calculated as described with reference to FIG. 7 on the basis of the correction data corresponding to the correction amounts shown in FIG. 13.

As an image signal correcting step in the image signal correcting unit 46 of the image processor 30, the sections of the image signal correcting unit 46 correct the image signals by the color components using the correction amounts calculated in step S18 (step S20). In step S20, the image signals are corrected by the color components as described with reference to FIG. 9.

This series of processes are ended when the image signal correcting process is performed on all the pixels (Y in step S22) and the process of step S14 is performed again when the image signal correcting process is not performed on all the pixels (N in step S22).

The image signals corrected in this way are input to the projection unit 100. As an image displaying step, the projection unit 100 projects the modulated light onto the screen SCR on the basis of the image signals corrected by the image processor 30 to display an image.

As described above, in the first processing example, the entire area of the correction table storage area of the ROM 82 or the RAM 84 as the correction table storage unit 40 is allocated as the correction table storage area common to the R component, the G component, and the B component. Accordingly, it is possible to perform the correction process common to the RGB color components while utilizing the memory capacity of the correction data to the maximum. Since the memory capacity of the correction data can be utilized to the maximum, it is possible to perform the correction process with higher precision and to correct with higher precision, for example, the shape of an image projected onto the cylindrical screen. The geometric correction in the first processing example may be a local geometric correction of a proximal projector, or the like.

Although it has been described in the first processing example that only the geometric correction is carried out without making a correction of the pixel shift, this embodiment is not limited to this configuration. For example, by allowing one correction table to include only the correction data corresponding to the amounts of pixel shift in display position of the R-component and B-component display sub pixels relative to the display position of the G-component display sub pixel, setting the process of correcting the G-component image signal and the process of correcting the B-component image signal having relatively-low eye sensitivity to OFF, and performing the process of correcting the R-component image signal, it is possible to precisely perform the pixel shift correcting process of the R component.

Second Processing Example

Figure 15:
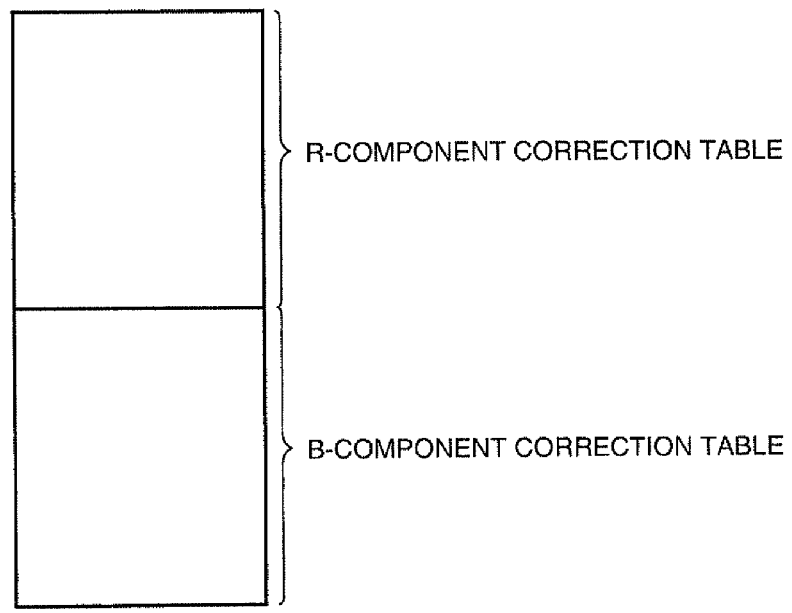
FIG. 15 is a diagram illustrating an example where a correction table storage area is allocated in a second processing example.

FIG. 15 is a diagram illustrating an example where the correction table storage area is allocated in a second processing example of this embodiment.

In FIG. 15, the correction table storage area of the ROM 82 or the RAM 84 as the correction table storage unit 40 is divided into two areas and is allocated as an R-component correction table storage area and a B-component correction table storage area. That is, in the second processing example, the correction table storage unit 40 stores only two kinds of correction tables.

In the second processing example, it is possible to correct the pixel shifts of the R component and the B component relative to the display position of the G-component display sub pixel out of the R-component, G-component, and B-component display sub pixels constituting one pixel. Accordingly, the correction table in the second processing example can be constructed by the correction data corresponding to the correction amount of the pixel shift.

Figure 16:
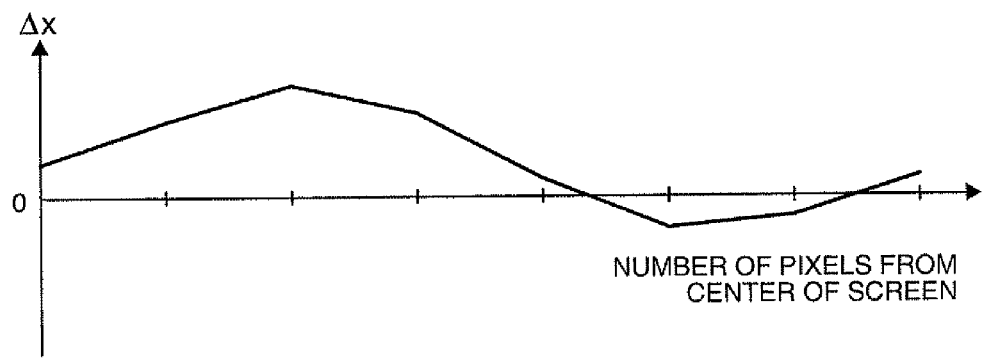
FIG. 16 is a diagram illustrating a correction amount of an R-component pixel shift in the second processing example.

FIG. 16 is a diagram illustrating an example of the correction amount of the pixel shift of the R component in the second processing example. In FIG. 16, the horizontal axis represents the number of pixels (distance) from the center of the screen and the vertical axis represents the correction amount of pixel shift Δx. In FIG. 16, plural amounts of pixel shift in the horizontal direction from the center of the screen is given, but only the amounts of the pixel shift of four corners of the display image may be given as described with reference to FIG. 7.

In the second processing example, the correction data corresponding to the correction amount Δx shown in FIG. 16 is stored in the correction table depending on the number of pixels from the center of the screen. In FIG. 16, the pixel shift amount distribution in the horizontal direction of the image is shown, but the amounts of pixel shift in the vertical direction of the image may be included in the correction table depending on the number of pixels from the center of the screen.

Figure 17:
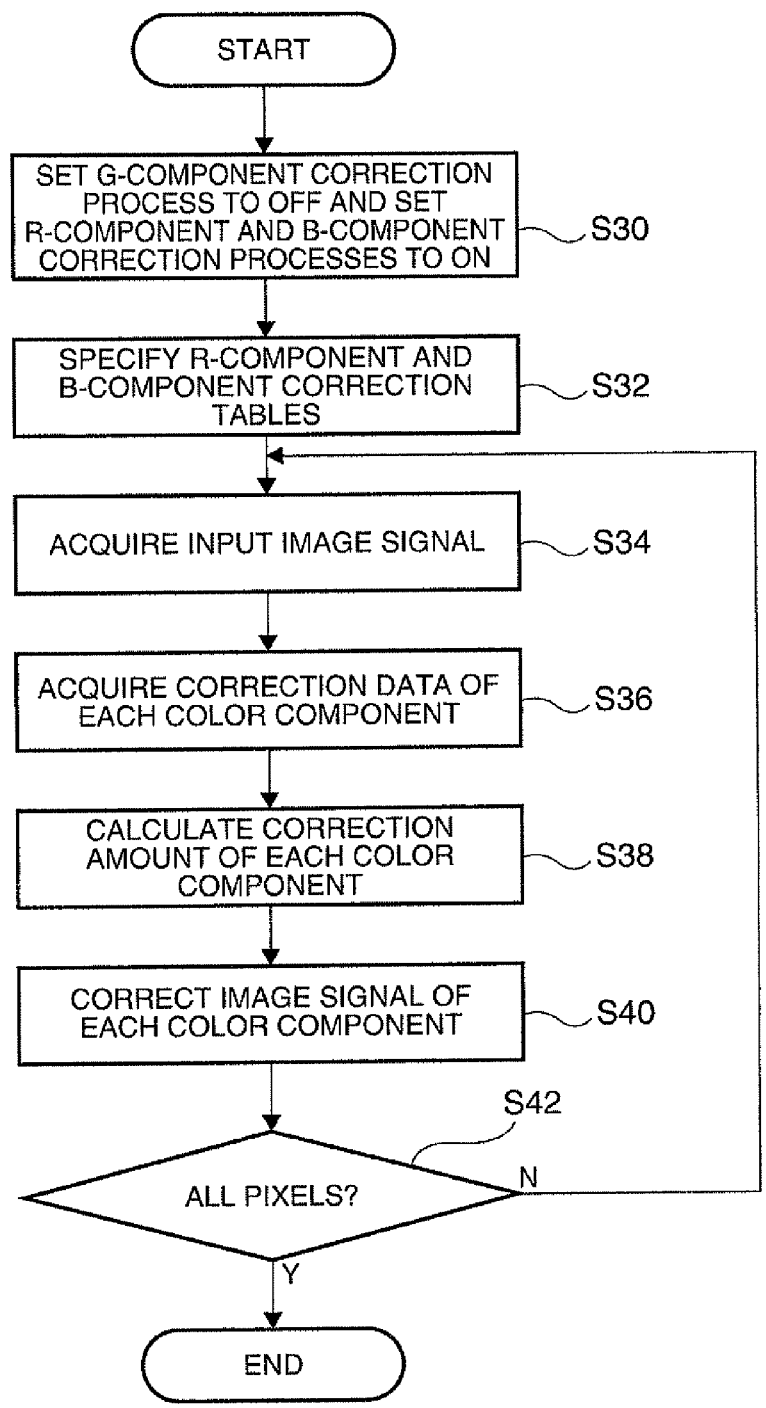
FIG. 17 is a flowchart illustrating processes of the image processor in the second processing example.

FIG. 17 is a flowchart illustrating the processes of the image processor 30 in the second processing example of this embodiment. In FIG. 17, it is assumed that the scanning lines in the horizontal direction of the display image have the same amounts of pixel shift in the horizontal direction as shown in FIG. 16 and the scanning lines in the vertical direction have the same pixel shift amount distribution in the vertical direction as shown in FIG. 16.

For example, a program for embodying the processes shown in FIG. 17 is stored in the ROM 82 in advance and the processes shown in FIG. 17 can be embodied by software by allowing the CPU 80 to read the program stored in the ROM 82 and to perform the processes corresponding to the program.

First, as the correction process ON/OFF setting step performed by the correction process specifying unit 52 of the image processor 30, the CPU 80 sets the correction process of the G component in the image processing circuit 88 to OFF and sets the correction process of the R and B components to ON (step S30). Accordingly, the image processor 30 performs the image signal correcting process on the R component and the B component.

As the correction table reference destination specifying step in the correction process specifying unit 52 of the image processor 30, the CPU 80 specifies which of the first and second correction tables 42$_1$ and 42$_2$ stored in the correction table storage unit 40 the image processing circuit 88 should refer to for each of the R and B components (step S32). Here, different correction tables should be referred to for the R component and the B component, respectively.

As the input image signal acquiring step, the image processor 30 acquires image signals corresponding to the sub pixels constituting the pixels of the input image from an image signal generating device not shown (step S34).

As the correction data acquiring step in the correction table selecting unit 50 of the image processor 30, the correction data of the respective color components are acquired on the basis of the correction tables respectively specified for the R component and the B component in step S32 (step S36).

As the correction amount calculating step in the correction amount calculating unit 44 of the image processor 30, the R-component correction amount calculating section 44R and the B-component correction amount calculating section 44B of the correction amount calculating unit 44 calculate the correction amounts of the color components (step S38). In step S38, the correction amounts of the color components are calculated by the interpolation process on the basis of the correction data corresponding to the correction amounts at the representative points shown in FIG. 16.

As an image signal correcting step in the image signal correcting unit 46 of the image processor 30, the R-component image signal correcting section 46R and the B-component image signal correcting section 46B of the image signal correcting unit 46 correct the image signals by the color components using the correction amounts calculated in step S38 (step S40). In step S40, the image signals are corrected by the color components as described with reference to FIG. 9.

This series of processes are ended when the image signal correcting process is performed on all the pixels (Y in step S42) and the process of step S34 is performed again when the image signal correcting process is not performed on all the pixels (N in step S42).

The image signals corrected in this way are input to the projection unit 100. As an image displaying step, the projection unit 100 projects the modulated light onto the screen SCR on the basis of the image signals corrected by the image processor 30 to display an image.

As described above, in the second processing example, the correction table storage area of the ROM 82 or the RAM 84, as the correction table storage unit 40, is divided and allocated as the R-component correction table storage area and the B-component correction table storage area. That is, when one pixel includes N sub pixels, the correction table storage unit 40 stores (N−1) types of correction tables of which each includes the correction data corresponding to the amount of pixel shift in the display position of the display sub pixel and the image signal correcting unit 46 independently corrects the image signals of (N−1) types of color components among the color components.

In the second processing example, since the correction table storage area is divided into two storage areas, the memory capacity of the correction data of the respective correction tables can be reduced in comparison with the first processing example, and it is possible to make a correction of two color components every color component with a simple structure. As a result, relative to the display position of the display sub pixel of one color component, it is possible to correct the pixel shift corresponding to the amount of pixel shift in the display position of the display sub pixels of the other color components.

It has been described in the second processing example that the pixel shift correcting process is performed using the G component as a reference, the R component or the B component may also be used as the reference. That is, one of plural color components constituting one pixel may be used as the reference.

Third Processing Example

Figure 18:
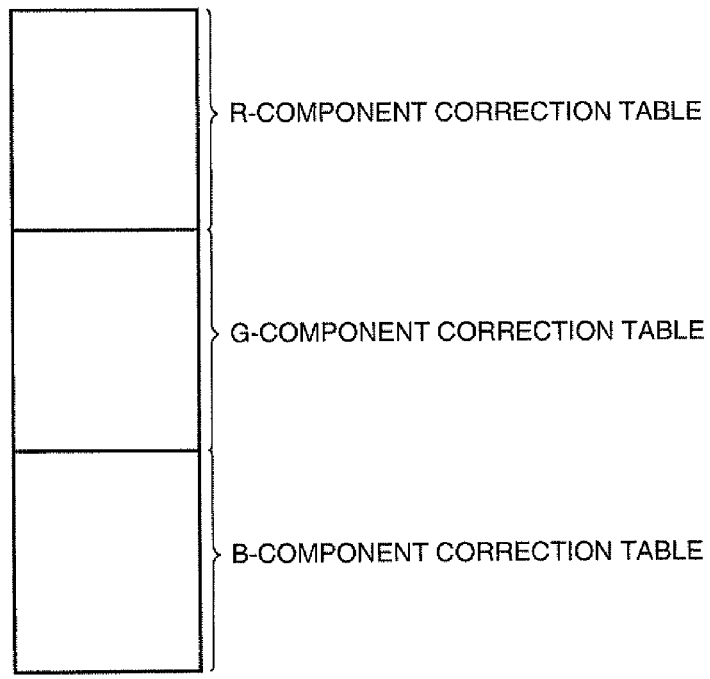
FIG. 18 is a diagram illustrating an example where a correction table storage area is allocated in a third processing example.

FIG. 18 is a diagram illustrating an example where the correction table storage area is allocated in a third processing example of this embodiment.

In FIG. 18, the correction table storage area of the ROM 82 or the RAM 84 as the correction table storage unit 40 is divided into three areas and is allocated as an R-component correction table storage area, a G-component correction table storage area, and a B-component correction table storage area. That is, in the third processing example, the correction table storage unit 40 stores three kinds of correction tables.

In the third processing example, it is possible to independently correct the pixel shifts of the R-component, G-component, and B-component display sub pixels constituting one pixel among the color components. Accordingly, the correction table in the third processing example can be constructed by the correction data corresponding to the geometric correction amount and the correction amount of the pixel shift.

Figure 19:
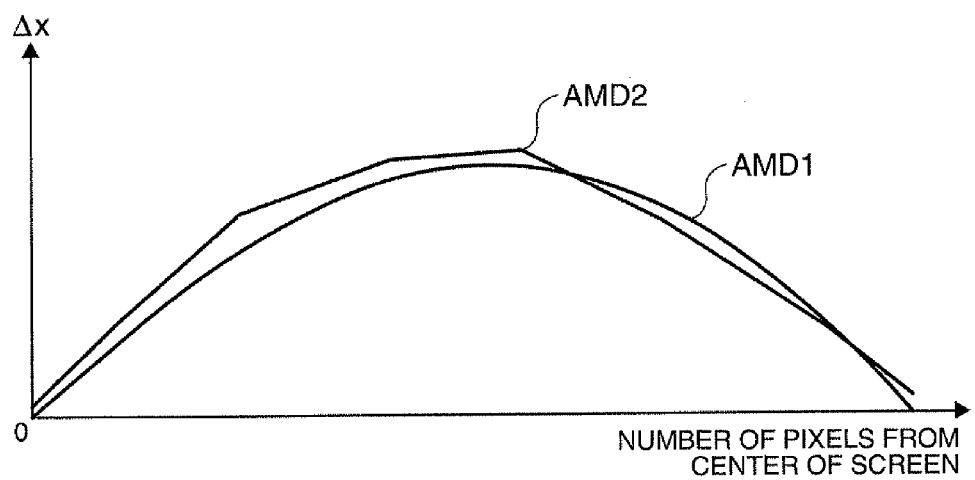
FIG. 19 is a diagram illustrating a correction amount in the third processing example.

FIG. 19 is a diagram illustrating an example of the correction amount of pixel shift in the third processing example. In FIG. 19, the horizontal axis represents the number of pixels (distance) from the center of the screen and the vertical axis represents the correction amount of pixel shift $\Delta x$.

In FIG. 19, the geometric correction amount AMD1 shown in FIG. 13 and the correction amount AMD2 in the third processing example are shown together. The correction amount AMD2 in the third processing example is acquired, for example, by adding the geometric correction amount shown in FIG. 13 and the correction amount of pixel shift shown in FIG. 16.

In the third processing example, the correction data corresponding to the correction amount AMD2 shown in FIG. 19 is stored in the correction table depending on the number of pixels from the center of the screen. In FIG. 19, the correction amount of only one color component is shown, but the correction amount distributions are given for the other color components and the correction data corresponding to the correction amount distributions are included in the correction table.

Figure 20:
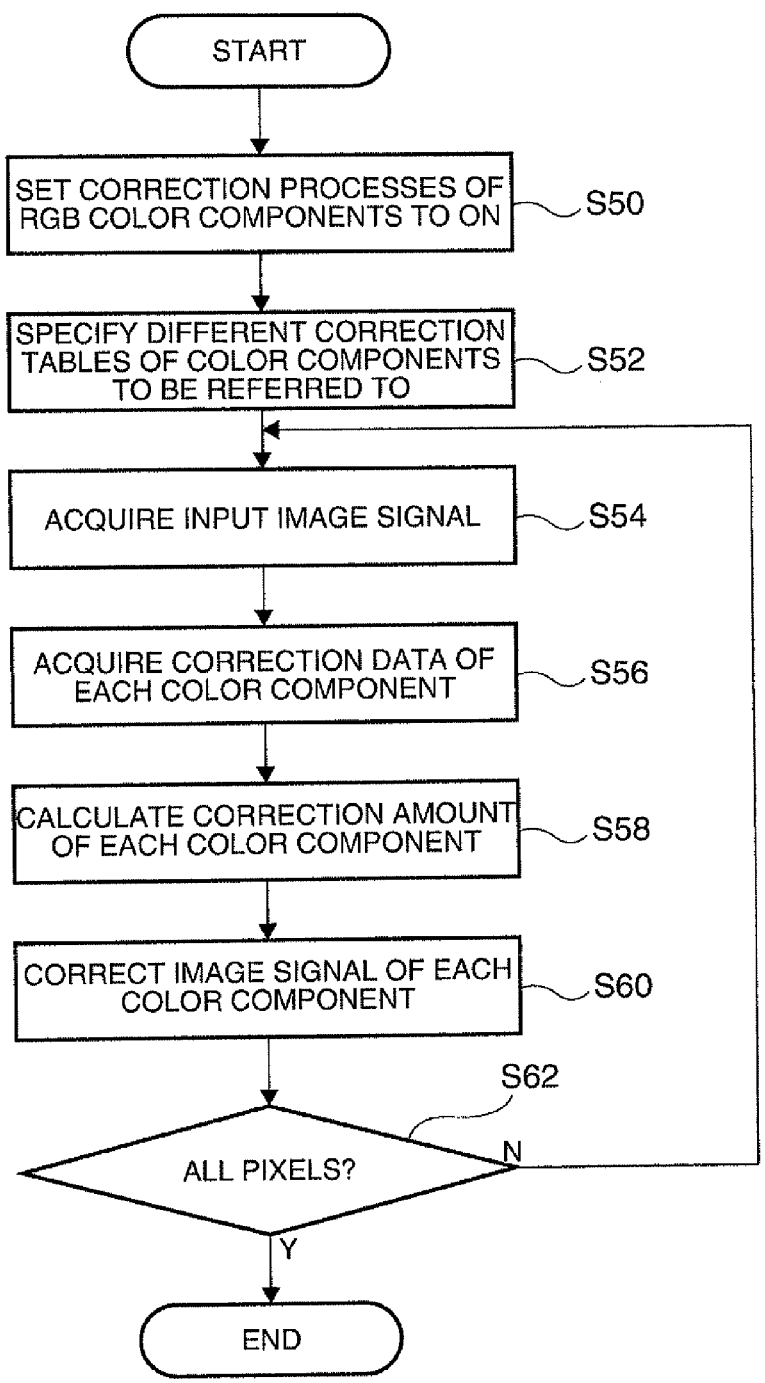
FIG. 20 is a flowchart illustrating processes of the image processor in the third processing example.

FIG. 20 is a flowchart illustrating the processes of the image processor 30 in the third processing example of this embodiment. In FIG. 20, it is assumed that the scanning lines in the horizontal direction of the display image have the same amounts of pixel shift in the horizontal direction, as shown in FIG. 19, and the scanning lines in the vertical direction have the same pixel shift amount distribution in the vertical direction as shown in FIG. 19.

For example, a program for embodying the processes shown in FIG. 20 is stored in the ROM 82 in advance and the processes shown in FIG. 20 can be embodied by software by allowing the CPU 80 to read the program stored in the ROM 82 and to perform the processes corresponding to the program.

First, as the correction process ON/OFF setting step performed by the correction process specifying unit 52 of the image processor 30, the CPU 80 sets the correction process of the RGB color components in the image processing circuit 88 to ON (step S50). Accordingly, the image processor 30 performs the image signal correcting process on the RGB color components.

As the correction table reference destination specifying step in the correction process specifying unit 52 of the image processor 30, the CPU 80 specifies different correction tables of the first to third correction tables $42_1$ to $42_3$ stored in the correction table storage unit 40 which the image processing circuit 88 should refer to for each of the R, G, and B components (step S52). For example, the R component is referred to the first correction table $42_1$, the G component is referred to the second correction table $42_2$, and the B component is referred to the third correction table $42_3$.

As the input image signal acquiring step, the image processor 30 acquires image signals corresponding to the sub pixels constituting the pixels of the input image from an image signal generating device not shown (step S54).

As the correction data acquiring step in the correction table selecting unit 50 of the image processor 30, the correction data of the respective color components are acquired on the basis of the correction tables respectively specified for the R component, the G component, and the B component in step S52 (step S56).

As the correction amount calculating step in the correction amount calculating unit 44 of the image processor 30, the sections of the correction amount calculating unit 44 calculate the correction amounts of the color components (step S58). In step S58, the correction amounts of the color components are calculated on the basis of the correction data corresponding to the correction amounts shown in FIG. 19.

As an image signal correcting step in the image signal correcting unit 46 of the image processor 30, the sections of the image signal correcting unit 46 correct the image signals by the color components using the correction amounts calculated in step S58 (step S60). In step S60, the image signals are corrected by the color components as described with reference to FIG. 9.

This series of processes are ended when the image signal correcting process is performed on all the pixels (Y in step S62) and the process of step S54 is performed again when the image signal correcting process is not performed on all the pixels (N in step S62).

The image signals corrected in this way are input to the projection unit 100. As an image displaying step, the projection unit 100 projects the modulated light onto the screen SCR on the basis of the image signals corrected by the image processor 30 to display an image.

As described above, in the third processing example, the correction table storage area of the ROM 82 or the RAM 84 as the correction table storage unit 40 is divided and allocated as the R-component correction table storage area, the G-component correction table storage area, and the B-component correction table storage area. That is, when one pixel includes N sub pixels, the correction table storage unit 40 stores N types of correction tables of which each includes the correction data corresponding to the amount of pixel shift in the display position of the display sub pixel and the geometric correction amount of the display image constructed by the display pixel, and the image signal correcting unit 46 independently corrects the image signals among the color components on the basis of the correction tables which differ depending on the color components.

In the third processing example, since the correction table storage area is divided into three storage areas, the memory capacity of the correction data of the respective correction tables can be reduced in comparison with the first and second processing examples, and it is possible to make a correction of three color components with a simple structure. As a result, it is possible to make both a correction of pixel shift and a geometric correction for each color component.

As described above, in this embodiment, the correction table storage unit storing one or more correction tables is provided, and the geometric correction of the display image formed by the display pixels displayed so as to superpose the display sub pixels corresponding to the sub pixels is performed on the image signals of the color components independently among the color components on the basis of the correction tables stored in the correction table storage unit. Therefore, by referring the color components to different correction tables, referring the color components to the correction tables common to the plural color components, or referring all the color components to the common correction table, it is possible to embody various correction processes with a simple configuration. Accordingly, by storing, for example, the correction tables corresponding to the amount of pixel shift in the display position of the display sub pixels and the geometric correction amount of the display image constructed by the display pixels, it is possible to make both a geometric correction of the display image and a correction of the pixel shift corresponding to the amount of pixel shift with a simple configuration, thereby reducing the delay time of the imaging process.

Although the image processing apparatus, the image displaying apparatus, and the image processing method according to the invention have been described with reference to the embodiment, the invention is not limited to the embodiment but may be modified in various forms without departing from the spirit and scope of the invention. For example, the invention may be modified as follows.

(1) Although it has been described in the above-mentioned embodiment that the correction table stored in the correction table storage unit includes the correction data corresponding to the amount of pixel shift of plural sub pixels sampled as representative points out of all the pixels in the display image and the correction amount calculating unit calculates the amount of pixel shift of a sub pixel, the invention is not limited to this configuration. For example, the correction table stored in the correction table storage unit may include the correction data corresponding to the amount of pixel shift of the entire screen and the correction amount calculating unit may be omitted.

(2) Although it has been described in the above-mentioned embodiment that the correction table stored in the correction table storage unit includes the correction data corresponding to the correction amount, the invention is not limited to this configuration. For example, the correction table stored in the correction table storage unit may include the correction amount itself.

(3) Although it has been described in the above-mentioned embodiment that three sub pixels of three color components constitute one pixel, the invention is not limited to this configuration. The number of color components constituting one pixel may be 2 or 4 or more.

(4) Although it has been described in the above-mentioned embodiment that the display position of one display sub pixel out of the display sub pixels constituting each display pixel is used as the reference position for the pixel shift correction amount, the invention is not limited to this configuration. For example, a predetermined position in a screen coordinate system or a predetermined position in a panel coordinate system of the liquid crystal panels may be used as the reference position.

(5) Although it has been described in the above-mentioned embodiment that a transmissive liquid crystal panel is used as the light modulating device, the invention is not limited to this configuration. For example, a DLP (Digital Light Processing) (registered trademark) or an LCOS (Liquid Crystal On Silicon) may be employed as the light modulating device.

(6) Although it has been described in the above-mentioned embodiment that a so-called 3-panel transmissive liquid crystal panel is employed as the light modulating device, a 2- or 4- or more-panel transmissive liquid crystal panel may be employed.

(7) The method of interpolating the amount of pixel shift of all the sub pixels and the method of correcting the image signals according to the invention are not limited to those described in the above-mentioned embodiment, but various methods such as a bi-linear method, a nearest neighboring method, a bi-cubic method, and an area gray-scale method may be employed, which the invention is not also limited to.

(8) Although it has been described in the above-mentioned embodiment that the invention is embodied as the image processing apparatus, the image displaying apparatus, and the image processing method, the invention is not limited to them. For example, the invention may be embodied as a recording medium on which a program describing a process sequence of the image processing method according to the invention is recorded.

The entire disclosure of Japanese Patent Application No. 2008-252668, filed Sep. 30, 2008 is expressly incorporated by reference herein.

What is claimed is:

1. An image processing apparatus for correcting image signals corresponding to a plurality of color images constituting an image, comprising:
    a correction table storage unit storing one or more correction tables; and
    an image signal correcting unit separately and independently correcting each of the plurality of color images of the image signals on the basis of one of the one or more correction tables stored in the correction table storage unit,
    wherein the separately and independently correcting comprises geometric correction for each of the plurality of color images of a display image corresponding to the image such that display color images each corresponding to the color images superpose each other, and simultaneous correction of a pixel shift caused by installation precision, an influence of temperature, or chromatic aberration of optical components, and
    wherein when the image is displayed on a cylindrical screen with a radius R by an displaying apparatus disposed backwardly apart by L from a point of view located at a center of the cylindrical screen, the one of the one or more correction tables stored in the correction table storage unit includes correction data of an angle θ by the use of the following expression, $$\Delta x = \frac{R\left(L + \sqrt{R^2 - w^2}\right)\sin\theta}{R\cos\theta + L} - \sqrt{R^2 - w^2}\tan\theta$$

where 2w represents a width in a horizontal direction of the cylindrical screen as viewed from the point of view and Δx represents correction data for a sub pixel in a direction of the angle θ from the point of view.

2. The image processing apparatus according to claim 1, wherein the correction table storage unit stores a correction table including correction data corresponding to an amount of pixel shift in a display position of a display color image and a geometric correction amount of the display image, and
    wherein the image signal correcting unit corrects the image signals so as to make the geometric correction of the display image and corrects the pixel shift to correspond to the amount of pixel shift.

3. The image processing apparatus according to claim 2, wherein the image signal correcting unit corrects the image signal of one sub pixel constituting the color image to make the geometric correction of the display image and corrects the pixel shift by interpolating the image signal of the one sub pixel and the image signals corresponding to one or more sub pixels around the one sub pixel on the basis of the correction table.

4. The image processing apparatus according to claim 1, wherein when one pixel is constructed by N (where N is an integer of 2 or greater) sub pixels, the correction table storage unit stores N types of correction tables of which each correction table includes correction data corresponding to an amount of pixel shift in a display position of display sub pixels and a geometric correction amount of the display image, and wherein the image signal correcting unit independently corrects the image signals among the color image on the basis of the correction tables which differ depending on the color image.

5. The image processing apparatus according to claim 1, wherein when one pixel is constructed by N (where N is an integer of 2 or greater) sub pixels, the correction table storage unit stores (N−1) types of correction tables of which each correction table includes correction data corresponding to the amount of pixel shift in a display position of display sub pixels, and wherein the image signal correcting unit independently corrects the image signals among (N−1) types of the plurality of color images.

6. An image displaying apparatus for displaying an image on the basis of image signals corresponding to a plurality of color images constituting the image, comprising:

the image processing apparatus according to claim 1; and
an image displaying unit making a display to superpose the display color images corresponding to the color images on the basis of the image signals corrected by the image processing apparatus.

7. The image processing apparatus according to claim 1, wherein the display color images superpose each other to minimize the pixel shift.

8. The image processing apparatus according to claim 1, wherein the display color images superpose each other such that their edges are aligned.

9. The image processing apparatus according to claim 1, wherein a R-component correction amount calculating section calculates an amount of pixel shift x_shift(x,y) by a linear interpolation process expressed by the following expression, $$\text{x\_shift}(x, y) = \left(1 - \frac{y}{H-1}\right) \cdot \left\{\left(1 - \frac{x}{W-1}\right) \cdot dx[0] + \left(\frac{x}{W-1}\right) \cdot dx[1]\right\} + \left(\frac{y}{H-1}\right) \cdot \left\{\left(1 - \frac{x}{W-1}\right) \cdot dx[2] + \left(\frac{x}{W-1}\right) \cdot dx[3]\right\},$$

wherein W is the number of pixels in the horizontal direction of a projection area, and H is the number of pixels in the vertical direction of the projection area.

10. The image processing apparatus according to claim 1, wherein a R-component correction amount calculating section calculates an amount of pixel shift x_shift(x,y) by a linear interpolation process expressed by the following expression, $$\text{y\_shift}(x, y) = \left(1 - \frac{x}{H-1}\right) \cdot \left\{\left(1 - \frac{y}{W-1}\right) \cdot dy[0] + \left(\frac{y}{W-1}\right) \cdot dy[1]\right\} + \left(\frac{x}{H-1}\right) \cdot \left\{\left(1 - \frac{y}{W-1}\right) \cdot dy[2] + \left(\frac{y}{W-1}\right) \cdot dy[3]\right\},$$

wherein W is the number of pixels in the horizontal direction of a projection area, and H is the number of pixels in the vertical direction of the projection area.

11. The image processing apparatus according to claim 1, wherein a R-component image signal correcting section calculates a pixel value IMGs[i][j] of a sub pixel R(i,j) by an area gray-scale method according to the following expression, $$\text{IMGs}[i][j] = (1 - y\_\text{shift}) \cdot \{(1 - x\_\text{shift}) \cdot \text{img}[i][j] + x\_\text{shift} \cdot \text{img}[i+1][j]\} + y\_\text{shift} \cdot \{(1 - x\_\text{shift}) \cdot \text{img}[i][j+1] + x\_\text{shift} \cdot \text{img}[i+1][j+1]\}.$$

12. An image processing method of correcting image signals corresponding to a plurality of color images constituting an image, comprising:

acquiring the image signals corresponding to the color images; and
correcting separately and independently each of the plurality of color images of the acquired image signals on the basis of one of one or more correction tables stored in a correction table storage unit,
wherein the separately and independently correcting of the image signals includes making a geometric correction for each of the plurality of color images of a display image corresponding to the image such that display color images each corresponding to the color images superpose each other, and also includes simultaneously correcting a pixel shift caused by installation precision, an influence of temperature, or chromatic aberration of optical components, and
wherein when the image is displayed on a cylindrical screen with a radius R by an image displaying apparatus disposed backwardly apart by L from a point of view located at a center of the cylindrical screen, the one of the one or more correction tables stored in the correction table storage unit includes correction data of an angle θ by the use of the following expression, $$\Delta x = \frac{R(L + \sqrt{R^2 - w^2})\sin\theta}{R\cos\theta + L} - \sqrt{R^2 - w^2}\tan\theta$$

where 2w represents a width in a horizontal direction of the cylindrical screen as viewed from the point of view and Δx represents correction data for a sub pixel in a direction of the angle θ from the point of view.

13. The image processing method according to claim 12, wherein the correction table storage unit stores a correction table including correction data corresponding to an amount of pixel shift in a display position of the display color images and a geometric correction amount of the display image, and wherein the correcting of the image signals includes correcting the image signals so as to make the geometric correction of the display image and correcting the pixel shift to correspond to the amount of pixel shift.

14. The image processing method according to claim 13, wherein the correcting of the image signals includes making the geometric correction of the image signal of one sub pixel constituting the color image and correcting the pixel shift by interpolating an image signal of the one sub pixel and the image signals corresponding to one or more sub pixels around the one sub pixel on the basis of the correction table.

15. The image processing method according to claim 12, wherein when one pixel is constructed by N (where N is an integer of 2 or greater) sub pixels, the correction table storage unit stores N types of correction tables of which each correction table includes correction data corresponding to an amount of pixel shift in a display position of display sub pixels and a geometric correction amount of the display image, and wherein the correcting of the image signals includes independently correcting the image signals among the color images on the basis of the correction tables which differ depending on the color images.

16. The image processing method according to claim 12, wherein when one pixel is constructed by N (where N is an integer of 2 or greater) sub pixels, the correction table storage unit stores (N−1) types of correction tables of which each correction table includes correction data corresponding to an amount of pixel shift in a display position of display sub pixels, and wherein the correction of the image signals includes independently correcting the image signals among (N−1) types of the plurality of color images.

17. The image processing method according to claim 12, wherein the display color images superpose each other to minimize the pixel shift.

18. The image processing method according to claim 12, wherein the display color images superpose each other such that their edges are aligned.

19. The image processing method according to claim 12, wherein a R-component correction amount calculating section calculates an amount of pixel shift x_shift(x,y) by a linear interpolation process expressed by the following expression, $$\text{x\_shift}(x, y) = \left(1 - \frac{y}{H-1}\right) \cdot \left\{\left(1 - \frac{x}{W-1}\right) \cdot dx[0] + \left(\frac{x}{W-1}\right) \cdot dx[1]\right\} +$$

-continued $$\left(\frac{y}{H-1}\right) \cdot \left\{\left(1 - \frac{x}{W-1}\right) \cdot dx[2] + \left(\frac{x}{W-1}\right) \cdot dx[3]\right\},$$

wherein W is the number of pixels in the horizontal direction of a projection area, and H is the number of pixels in the vertical direction of the projection area.

20. The image processing method according to claim 12, wherein a R-component correction amount calculating section calculates an amount of pixel shift x_shift(x,y) by a linear interpolation process expressed by the following expression, $$\text{y\_shift}(x, y) = \left(1 - \frac{x}{H-1}\right) \cdot \left\{\left(1 - \frac{y}{W-1}\right) \cdot dy[0] + \left(\frac{y}{W-1}\right) \cdot dy[1]\right\} +$$

$$\left(\frac{x}{H-1}\right) \cdot \left\{\left(1 - \frac{y}{W-1}\right) \cdot dy[2] + \left(\frac{y}{W-1}\right) \cdot dy[3]\right\},$$

wherein W is the number of pixels in the horizontal direction of a projection area, and H is the number of pixels in the vertical direction of the projection area.

21. The image processing method according to claim 12, wherein a R-component image signal correcting section calculates a pixel value IMGs[i][j] of a sub pixel R(i,j) by an area gray-scale method according to the following expression, IMGs[i][j]=(1−y_shift)·{(1−x_shift)·img[i][j]+
x_shift·img[i+1][j]}+y_shift·{(1−x_shift)·img[i]
[j+1]+x_shift·img[i+1][j+1]}.

\* \* \* \* \*